US007536112B2

(12) United States Patent
Yonenaga et al.

(10) Patent No.: US 7,536,112 B2
(45) Date of Patent: May 19, 2009

(54) OPTICAL TRANSMISSION SYSTEM

(75) Inventors: Kazushige Yonenaga, Kanagawa (JP);
Yutaka Miyamoto, Kanagawa (JP);
Akihiko Matsuura, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 857 days.

(21) Appl. No.: 09/939,716

(22) Filed: Aug. 28, 2001

(65) Prior Publication Data

US 2002/0033984 A1    Mar. 21, 2002

(30) Foreign Application Priority Data

Aug. 30, 2000  (JP) .............................. 2000-261114

(51) Int. Cl.
*H04B 10/04* (2006.01)
(52) U.S. Cl. ................... 398/198; 398/183; 398/184; 398/185; 398/186; 398/187; 398/188; 398/190; 398/191
(58) Field of Classification Search ................. 398/193, 398/192, 182, 198; 385/1, 2, 3, 14, 40, 129–131
See application file for complete search history.

(56) References Cited

U.S. PATENT DOCUMENTS

| | | | | |
|---|---|---|---|---|
| 5,271,074 A | * | 12/1993 | Tocci ........................... | 385/16 |
| 5,543,952 A | * | 8/1996 | Yonenaga et al. ............ | 398/185 |
| 5,644,664 A | * | 7/1997 | Burns et al. .................. | 385/2 |
| 5,917,638 A | * | 6/1999 | Franck et al. ................ | 398/201 |
| 6,415,003 B1 | * | 7/2002 | Raghavan ..................... | 375/317 |

(Continued)

FOREIGN PATENT DOCUMENTS

EP    1 004 920 A2    2/2000

(Continued)

OTHER PUBLICATIONS

Chapter 7, Introduction to CMOS design, by E. Di Zitti, WP3 Electronic Engineering Pilot University of Genoa (http://www.esng.dibe.unige.it/Projects/Netpro/PagineLocali/micro/doc/ch7i.PDF).*

(Continued)

*Primary Examiner*—Ken N Vanderpuye
*Assistant Examiner*—Danny W Leung
(74) *Attorney, Agent, or Firm*—Kratz, Quintos & Hanson, LLP.

(57) ABSTRACT

An optical transmission system which provides bandwidth restricted optical signal comprises an input terminal (10) for accepting an electrical binary signal, an amplifier (12) for amplifying said electrical binary signal to the level requested for operating an electrical-optical converter (16) such as a Mach Zehnder light modulator, a bandwidth restriction means (14) which is for instance a low pass filter for restricting bandwidth of said electrical binary signal, and an electrical-optical conversion means (16) such as a Mach Zehnder light modulator for converting electrical signal to optical signal. Because of the location of the low pass filter (14) between an output of the amplifier (12) and the Mach Zehnder light modulator (16), the amplifier (12) may operate in saturation region to provide high level output signal enough for operating the Mach Zehnder light modulator, and a signal shaped by the low pass filter (14) is applied to the Mach Zehnder light modulator (16) with excellent waveform. The invention is useful for long distance, large capacity and low cost optical transmission system.

2 Claims, 23 Drawing Sheets

U.S. PATENT DOCUMENTS

| | | | |
|---|---|---|---|
| 6,483,953 B1 * | 11/2002 | McBrien et al. | 385/2 |
| 6,556,328 B1 * | 4/2003 | Tanaka | 398/192 |
| 6,728,277 B1 * | 4/2004 | Wilson | 372/38.1 |
| 2001/0046077 A1 | 11/2001 | Akiyama et al. | 359/161 |

FOREIGN PATENT DOCUMENTS

| | | |
|---|---|---|
| EP | 0 977 382 A2 | 5/2000 |
| JP | 8-139681 | 5/1996 |
| JP | 2001-339345 | 12/2001 |

OTHER PUBLICATIONS

Chapter 7, Introduction to CMOS design, by Etienne Sicard, National Institute of Applied Sciences, Department of Ele. & Comp. Engineering, (http://www.esng.dibe.unige.it/Projects/Netpro/PagineLocali/micro/doc/ch7i.PDF), Copyrighted 1997, 2001.*

Haeyang Chung et al.; "Modeling and Optimization of Traveling-Wave LiNbO$_3$ Interferometric Modulators"; IEEE Journal of Quantum Electronics; vol. 27, No. 3; Mar. 1991; pp. 608-617.

Yonenaga et al.; Journal of Lightwave Technology, vol. 15, No. 8, pp. 1530-1537, Aug. 1997.

* cited by examiner

Fig. 8
(a)
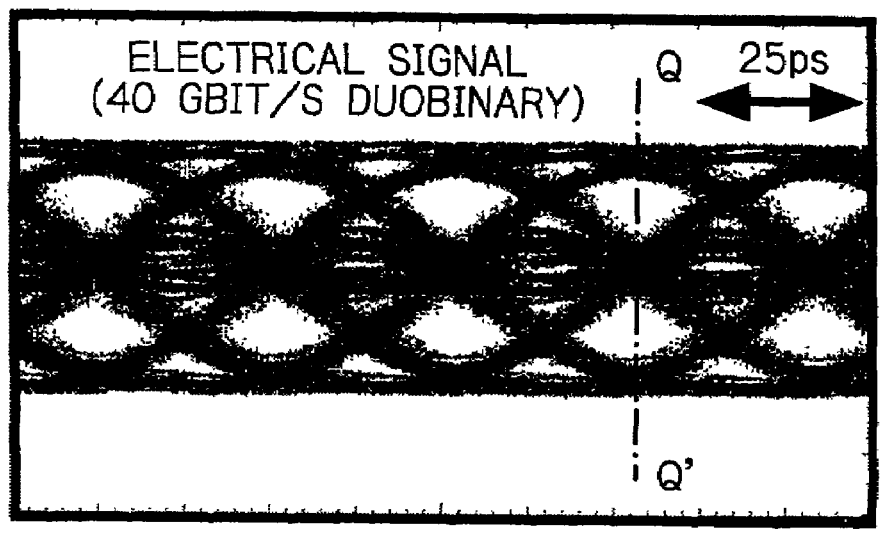
(b)
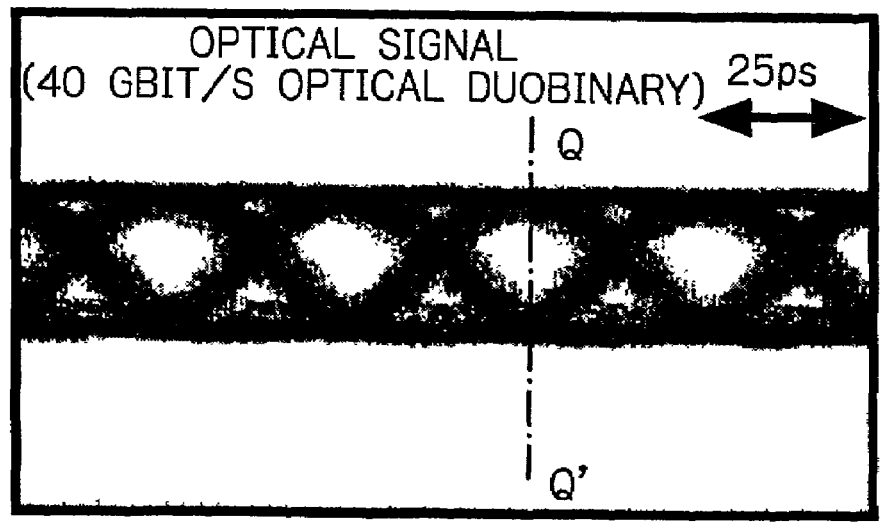

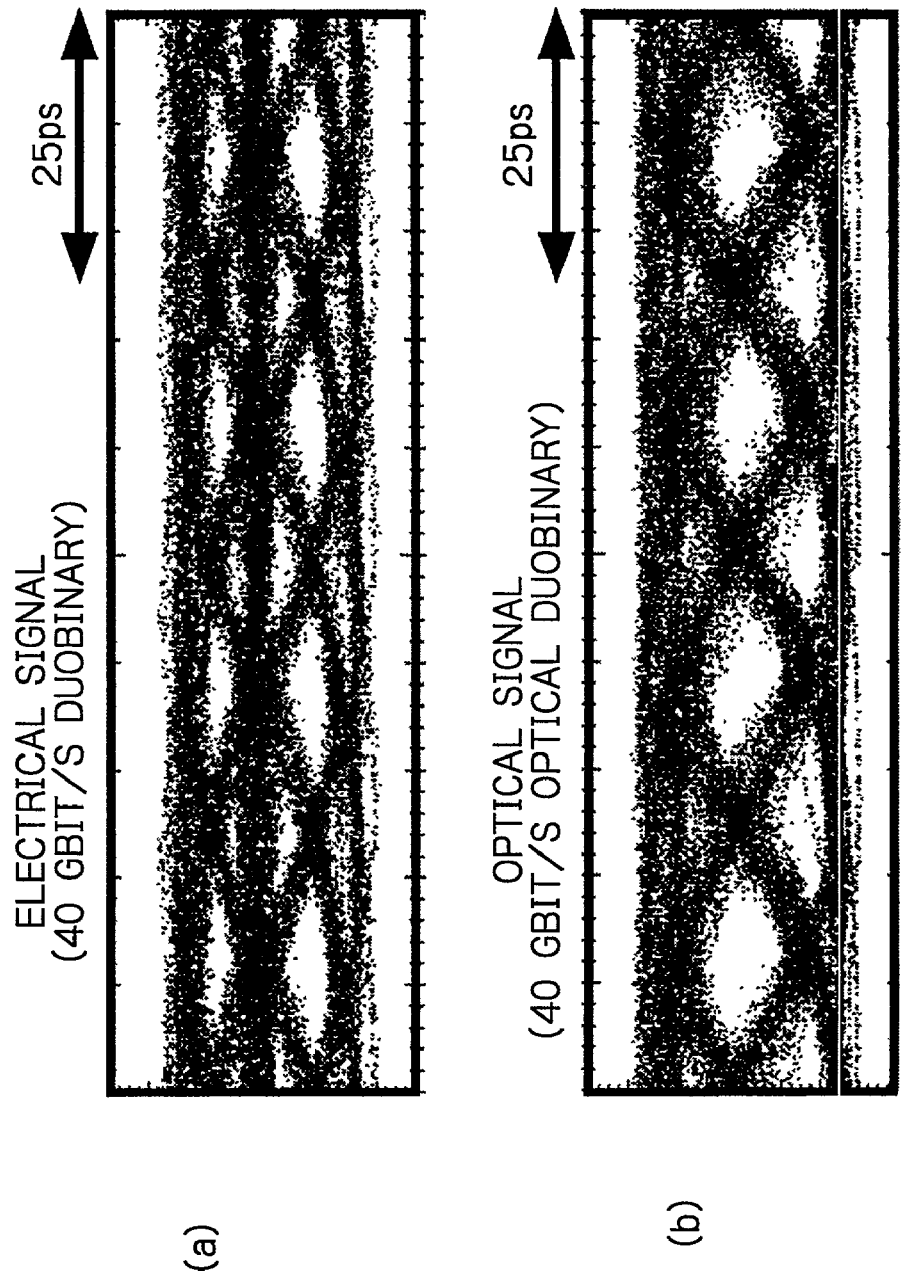

ent terminal 10, then, to a precoder 32 which effects
OPTICAL TRANSMISSION SYSTEM

BACKGROUND OF THE INVENTION

The present invention relates to an optical transmission system, in particular, relates to such a system which generates high quality, high rate and bandwidth restricted optical signal free from degradation of signal quality in a transmission line.

In an optical transmission system, a large amount of transmission capacity is intended by using high-bit-rate channel, and wavelength division multiplexing. In general, the higher a channel bit rate is, the more severe the effect of chromatic dispersion in an optical fiber is, and possible distance for transmission is shortened in proportional to square of channel bit rate.

In order to decrease the effect of chromatic dispersion due to difference of group velocity depending upon wavelength, the use of bandwidth restricted code such as an optical duobinary transmission system is useful as described in K. Yonenaga and S. Kuwano, IEEE J. Lightwave Technol., Vol. 15, No. 8, 1997.

FIG. 21 shows a block diagram of a prior optical duobinary transmitter. An input binary signal to be transmitted is applied to an input terminal 10, then, to a precoder 32 which effects code conversion, through an inverter 30 which inverts a binary signal. The precoder 32 includes an exclusive OR circuit 32a and a one bit delay circuit 32b as shown in FIG. 21. An output logic signal of the precoder 32 is kept when an input logic signal is 0, and an output logic signal is inverted when an input logic signal is 1. An output of the precoder 32 is applied to a differential distribution circuit 34 which provides a pair of NRZ (non-return to zero) signals in differential form. Each of the pair of NRZ signals is converted to a ternary duobiary signal by a low pass filter 100-1 or 100-2 which has 3 dB cut-off frequency approximate at the ¼ frequency of signal (clock frequency. A filter 100-1 or 100-2 which operates above is called a duobinary filter. An electrical-optical converter 110 is for instance implemented by a Mach Zender intensity modulator (MZ) of dual electrode drive type, having electrical-optical crystal such as Lithium-Niobate ($LiNbO_3$). A pair of duobinary signals generated by duobinary filters 100-1 and 100-2 are applied to electrodes of the MZ modulator after amplification by amplifiers 102-1 and 102-2 up to half wavelength voltage. The numeral 18 is an optical output, and the numeral 36 is a light source of continuous light which is subject to be modulated by the MZ modulator 110.

FIG. 22 shows operation of a MZ modulator. FIG. 22(a) shows waveform of electrical duobinary signal for driving a MZ modulator. A duobinary signal is a ternary signal having three levels +1, 0 and −1 as shown in FIG. 22(b). The transmission factor of a MZ modulator varies sinuously as shown in the optical transmission characteristic in FIG. 22(c) depending upon drive voltage which is voltage difference between two electrodes of the MZ modulator. When two electrodes are complementary driven, an undesired chirp in an output optical signal may be zero in principle. Therefore, when a D.C. bias voltage (B) is set so that the optical transmission factor is the minimum as shown in FIG. 22(c), an optical phase of an optical output switches just when an input voltage crosses the bias voltage (B), and therefore, an optical duobinary signal which has binary intensity waveform is obtained. Although an optical duobinary signal is a binary intensity signal as shown in FIG. 22(d) and FIG. 22(e) in optically modulated form, it is essentially ternary duobinary signal if we consider optical phase (0, π), and has the equivalent bandwidth as that of duobinary signal. Therefore, an optical duobinary signal has the advantages of both binary intensity modulation and ternary duobinary signal, so that demodulation is possible by binary intensity detection, and narrow-band characteristic of a duobinary signal is obtained.

FIG. 23 shows a block diagram of a whole duobinary transmission system including an optical duobinary transmitter 120, a transmission line 124, optical amplifiers 122, and a receive system having an optical-electrical converter 126, a low pass filter 128, a decision circuit 130 and an binary data output terminal 132. An optical duobinary transmitter 120 in FIG. 23 may take the structure as shown for instance in FIG. 21. In a receive side, a signal is demodulated by merely detecting light intensity as is the case of detection of binary intensity modulation signal.

FIG. 24 shows actually measured relations between chromatic dispersion and power penalty for 40 Gbit/s optical duobinary signal (white dot) and 40 Gbit/s binary NRZ intensity modulation signal (black dot). The horizontal axis shows chromatic dispersion value, and the vertical axis shows power penalty for bit error rate (BER) $10^{-9}$. A power penalty is defined as the increase of receiver sensitivity compared with that measured at the BER of $10^{-9}$ when the chromatic dispersion is 0. A dispersion tolerance is defined so that it is the width of chromatic dispersion value which satisfies the power penalty less than 1 dB. FIG. 23 shows that the dispersion tolerance of an optical duobinary signal is 200 ps/nm, and the dispersion tolerance of a binary NRZ signal is 95 ps/nm, therefore, the former is more than twice as large as the latter. Thus, an optical duobinary signal has the advantage that the restriction by chromatic dispersion is considerably decreased in high rate signal transmission which has severe effect of chromatic dispersion.

However, a prior optical duobinary transmission system has the disadvantage that an optical transmitter is complicated and requests complicated signal process. In particular, an optical duobinary signal which is generated by a duobinary filter must be amplified up to the level which is enough for driving an optical modulator. In general, voltage level requested for driving an optical modulator is several times as high as voltage level for operating a high rate digital integrated circuit. Therefore, an amplifier which drives an optical modulator is operated in the high power region where an output voltage is apt to saturate.

In case of a binary NRZ intensity modulation system, even if a driver amplifier is operated in high power region where saturation begins, no degradation of aperture of eye pattern occurs, or waveform is even shaped by shortening rising time and falling time of waveforms.

However, in case of a ternary duobinary signal, it is essential to keep waveform itself, therefore, a driver amplifier for driving an optical modulator must have fine linearity in gain characteristics.

Thus, if a driver amplifier for driving an optical modulator used in a conventional binary NRZ intensity modulation system is used for amplifying a ternary duobinary signal, a small distortion of waveform is emphasized, and severe inter-symbol interference is generated. Further, it might be possible that an inter-symbol interference is emphasized by reflection between a duobinary filter and an amplifier, and/or reflection between an amplifier and an optical modulator.

FIG. 25(a) shows waveform of duobinary signal (electrical signal) of 40 Gbit/s generated by a prior driver, and FIG. 25(b) shows optical intensity waveforms modulated by said signal. It is noted in FIG. 25 that an electrical signal for driving an optical modulator has asymmetrical pattern in eye apertures between upper eye opening and lower eye opening, and further an optical intensity signal modulated by said electrical signal is degraded in waveforms because of inter-symbol interference although an eye aperture is kept. An inter-symbol interference degrades receive sensitivity of optical duobinary signal, and dispersion tolerance so that distance for transmission is considerably decreased.

SUMMARY OF THE INVENTION

It is an object of the present invention, therefore, to provide a new and improved optical transmitter which overcomes a disadvantage and a limitation of a prior optical transmitter.

It is also an object of the present invention to provide an optical transmitter which provides bandwidth restricted optical signal close to ideal condition so that optical transmission with long distance, large capacity, and low cost is obtained.

The above and other objects of the present invention are attained by an optical transmitter comprising bandwidth restriction means for restricting bandwidth of input electrical binary signal, an electrical-optical conversion means for converting electrical signal which is bandwidth restricted by said bandwidth restriction means to optical signal, an amplifier for amplifying an input signal of said electrical-optical conversion means so that said input signal has enough level for operating said electrical-optical conversion means, and said bandwidth restriction means being located between an output of said amplifier and an input of said electrical-optical conversion means.

In an optical transmitter of the present invention, bandwidth restriction means which is implemented for instance by a low pass filter is located between an output of an amplifier for driving a modulator and an input of an optical modulator, therefore, said amplifier has only to amplify a binary NRZ signal so that inter-symbol interference problem is avoided even when it operates in saturation region.

In one modification of the present invention, a waveform shaping means such as a low pass filter is implemented by a part of said amplifier or said optical modulator, thus, not only an optical transmitter is compact, but also harmful reflection between an amplifier and a filter, and/or a filter and an optical modulator is avoided so that an optical transmitter with high performance is obtained.

BRIEF DESCRIPTION OF THE DRAWINGS

The foregoing and other objects, features, and attendant advantages of the present invention will be appreciated as the same become better understood by means of the following description and accompanying drawings wherein;

FIG. 8 shows waveforms of 40 Gbit/s signal generated by the fourth embodiment, FIG. 25 shows waveforms of 40 Gbit/s generated by a prior optical transmitter.

DESCRIPTION OF THE PREFERRED EMBODIMENTS

First Embodiment

Figure 1:
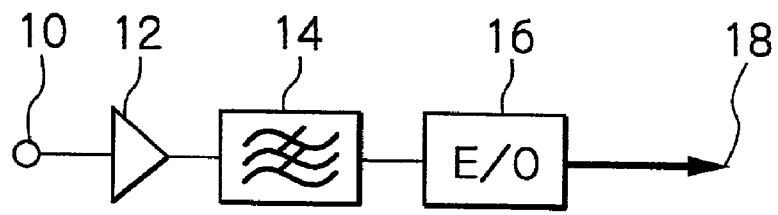
FIG. 1 is a block diagram of first embodiment of an optical transmitter according to the present invention.
Figure 21:
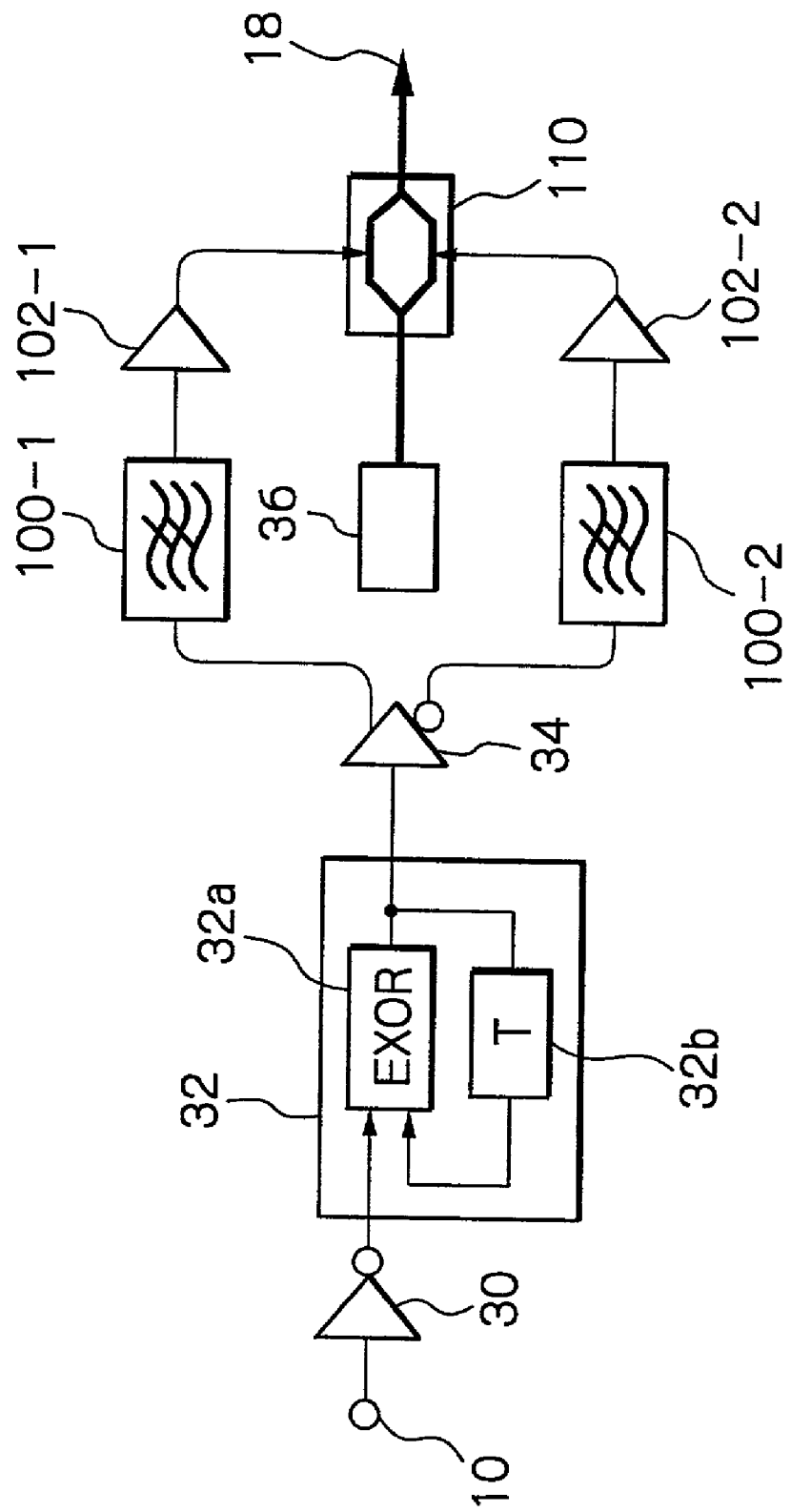
FIG. 21 is a block diagram of a prior optical duobinary transmitter.
Figure 22:
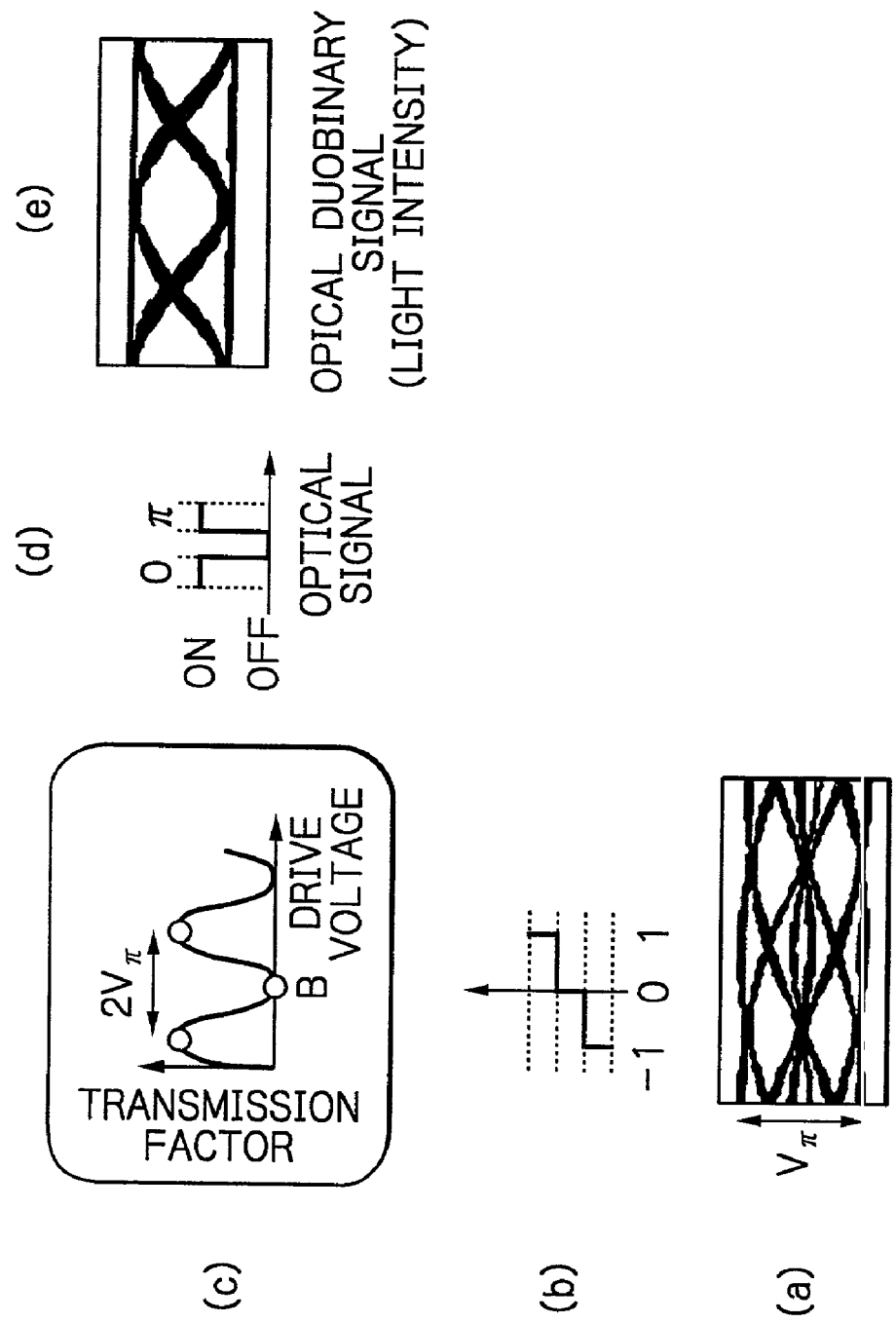
FIG. 22 shows operation of a prior optical duobinary transmitter.
Figure 23:
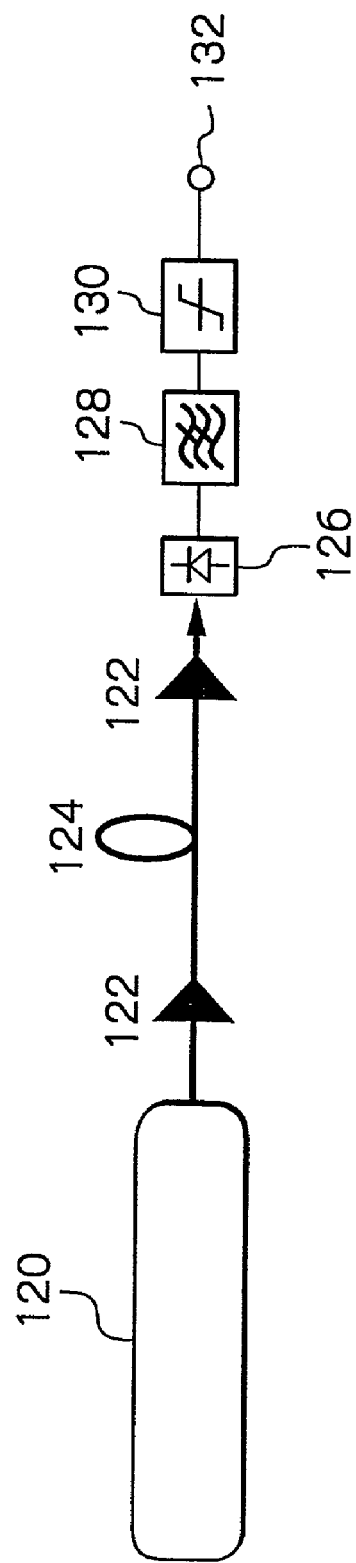
FIG. 23 shows a prior optical transmission system.

FIG. 1 is a block diagram of a first embodiment of an optical transmitter according to the present invention. In the embodiment, an optical transmitter comprises an input terminal 10 which receives an electrical binary data signal, a binary signal amplifier 12 for amplifying the binary data signal, a bandwidth restriction means 14 which is implemented by a low pass filter for restricting bandwidth of an output signal of the amplifier 12, an electrical-optical conversion means 16 for converting electrical signal of an output of the filter 14 to optical form, and an optical output terminal 18 coupled with an output of the electrical-optical converter 16. The feature in FIG. 1 is that the bandwidth restriction means 14 is located between the binary signal amplifier 12 and the electrical-optical conversion means 16, while the bandwidth restriction means in a prior art (FIG. 21) is located at an input side of an amplifier. Because of the location of the bandwidth restriction means 14 at an output side of the amplifier 12, an undesired distortion generated by the amplifier 12 is removed by the bandwidth restriction means 14, and the resultant optical signal is free from undesired distortion. It is a matter of course that an actual transmitter has many components which are not shown in FIG. 1, for providing necessary function as an optical transmitter.

The bandwidth restriction means 14 or the filter is equivalent to the circuit consisting of a one-bit delay which delays an input signal by one bit, and an adder which provides sum of an output of the one-bit delay and an input signal.

The restriction of bandwidth of an electrical signal by using the bandwidth restriction means 14 restricts the bandwidth of an optical signal, and it decreases undesired effect by chromatic dispersion and improves transmission performance, and the efficiency of the use of bandwidth by high density wavelength division multiplexing. An electrical-optical conversion means 16 may be either a semiconductor laser in which an optical source is directly modulated, or a combination of a continuous light source and an external modulator. An external modulator may be any type of modulator, for instance, a field absorption type modulator using a semiconductor, or a MZ (Mach Zehnder) type modulator using electrical-optical crystal such as $LiNbO_3$.

The spectrum of optical signal is designed according to a bandwidth restriction means 14. As the spectrum of optical signal depends upon an input signal waveform applied to a binary signal amplifier 12, response characteristic of a binary signal amplifier 12 and an electrical-optical converter 16, the response characteristic of a bandwidth restriction means 14 is designed considering those conditions.

When it is desired to suppress signal bandwidth with no inter-symbol interference, an optical signal from an optical transmitter must satisfy the Nyquist criterion of zero inter-symbol interference.

Figure 2:
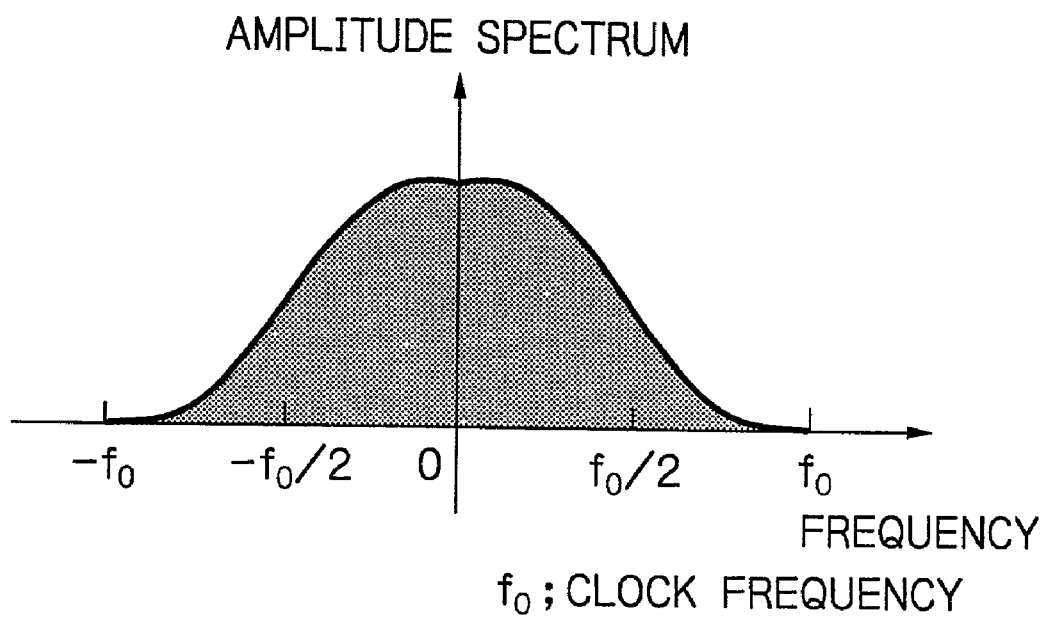
FIG. 2 is an example of an optical spectrum generated by the first embodiment.

FIG. 2 shows an ideal signal spectrum which satisfies the Nyquist criterion I, in which $f_0$ is clock frequency of a signal, and when bit rate is 40 Gbit/s, $f_0$=40 GHz. The amplitude spectrum decreases half at frequency $f_0/2$ of that of D.C. component, and reaches zero at approximate $f_0$. The maximum frequency of the signal spectrum which satisfies the Nyquist criterion I distributes between $f_0/2$ and $f_0$ depending upon shape of spectrum. As it is very difficult to suppress the maximum frequency of the signal spectrum to $f_0/2$ in the Nyquist criterion I, the maximum frequency $f_0$ of the signal spectrum, as shown in FIG. 2, is allowed so that it is realized by an actual low pass filter.

It is important that the signal waveform shaped by a low pass filter is kept until at least it is transmitted into a transmission line through conversion into an optical form, therefore, according to the present invention, a signal amplifier 12 which is apt to provide inter-symbol interference is located at an input side of a low pass filter 14, so that an output of the low pass filter 14 drives directly an electrical-optical converter 16 to provide an excellent light signal waveform.

Second Embodiment

Figure 3:
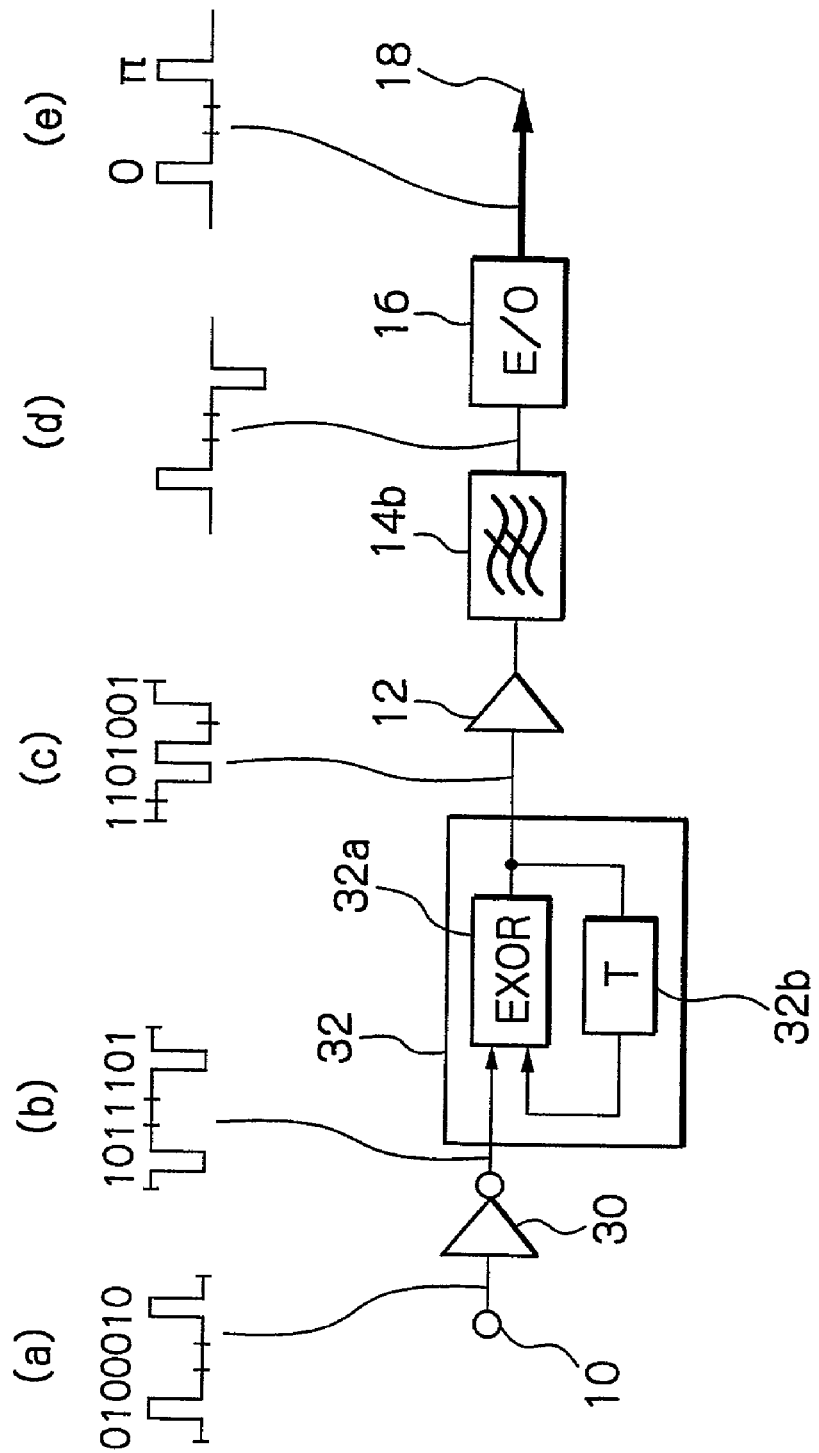
FIG. 3 is a block diagram of second embodiment of an optical transmitter according to the present invention.

FIG. 3 shows a second embodiment of an optical transmitter which uses duobinary code according to the present invention. In order to further suppress bandwidth, the bandwidth restriction code such as duobinary code which satisfies the Nyquist criterion II is used. The bandwidth restriction means 14b in the current embodiment is a duobinary filter which is a low pass filter having 3 dB cutoff frequency around $f_0/4$.

Figure 4:
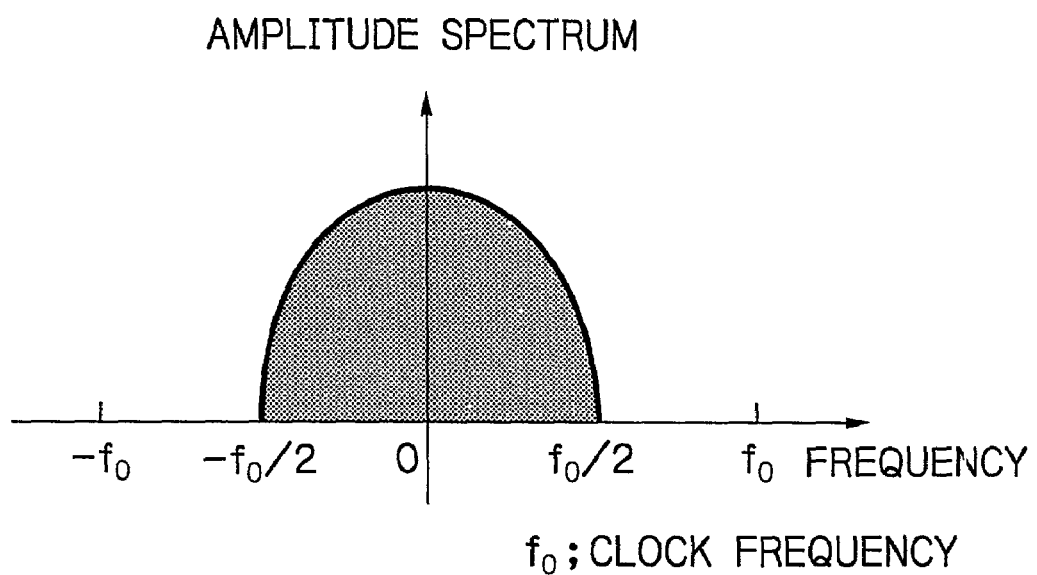
FIG. 4 is an example of an optical spectrum generated by the second embodiment.

FIG. 4 shows a signal spectrum of an ideal duobinary signal. The maximum frequency of a duobinary signal spectrum is $f_0/2$, however, as it is cutoff moderately, it may be implemented by using an actual filter.

By the way, as a duobinary filter accompanies code conversion from a binary signal to a ternary signal, the current embodiment has a code inverter 30 and a precoder 32 before a binary signal amplifier 12.

A code inverter 30 inverts an input code, 0 or 1, to 1 or 0. A precoder 32 comprises an exclusive-OR circuit 32a and a one-bit delay 32b which delays a signal by one bit duration or a period T. Inputs of the exclusive-OR circuit 32a are an output of the inverter 30 and an output of the one-bit delay 32b, and an input of the one-bit delay 32b is an output of the exclusive-OR circuit 32a.

Due to the presence of a code inverter 30 and a precoder 32, a ternary signal of an output of a duobinary filter 14b has a logical signal 1 corresponding to high level and low level, and logical signal 0 corresponding to intermediate level. Therefore, a receive side may correctly demodulate a receive signal by deciding whether a receive signal is at intermediate level (logical 0) or not (logical 1).

Assuming that an electrical binary signal at an input terminal 10 is (0, 1, 0, 0, 0, 1, 0) as shown in (a), an output (b) of an inverter 30 is an inverted form of (1, 0, 1, 1, 1, 0, 1) an output of a precoder 32 shown in (c) which is in NRZ form of (1, 1, 0, 1, 0, 0, 1), an output of a duobinary filter 14b is shown in (d) which is a ternary duobinary signal having level (0, +1, 0, 0, 0, −1, 0), and an optical output of a converter 16 is shown in (e) which has (0, 1, 0, 0, 0, 1, 0) with a phase corresponding to the first 1 being opposite to that of the second 1.

As it is essential that a signal shaped by a duobinary filter keeps a waveform itself at least until it is transmitted into a transmission line through conversion into an optical signal, a signal amplifier which may cause inter-symbol interference is located before a duobinary filter, so that a distortion generated by an amplifier is removed by a duobinary filter and an output of the duobinary filter drives directly an electrical-optical converter to provide excellent optical signal waveform.

Third Embodiment

Figure 5:
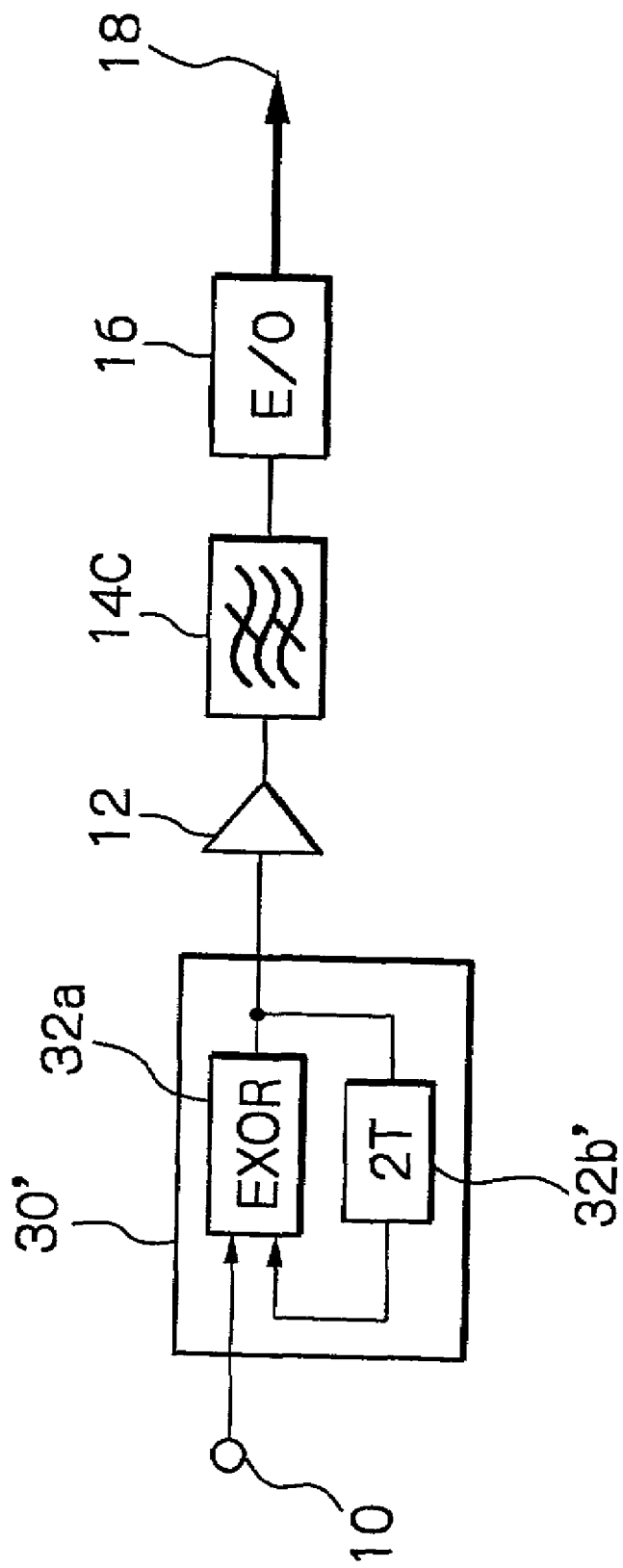
FIG. 5 is a block diagram of third embodiment of an optical transmitter according to the present invention.
Figure 6:
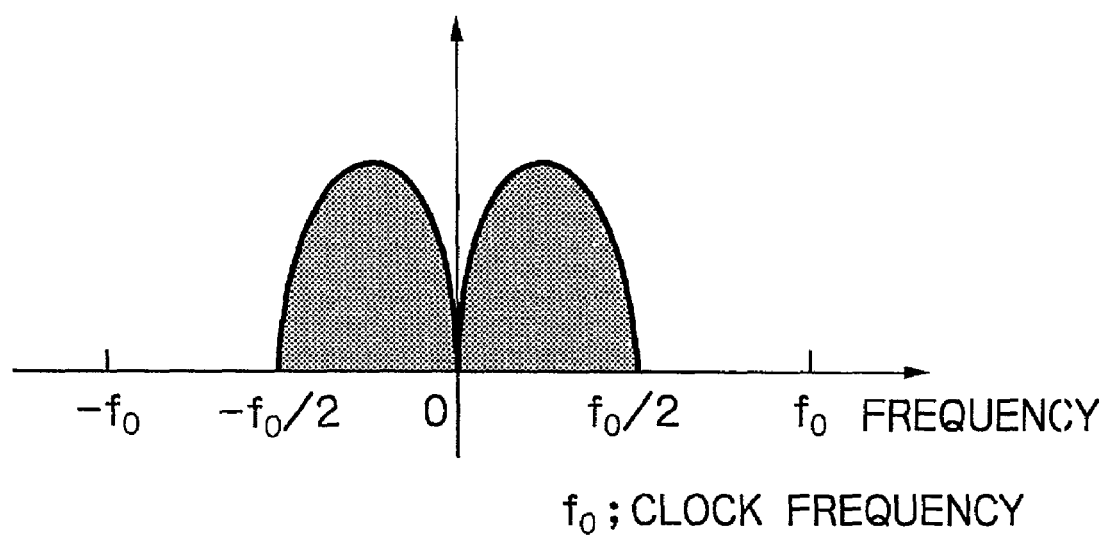
FIG. 6 is an example of an optical spectrum generated by the third embodiment.

FIG. 5 shows a third embodiment of an optical transmitter according to the present invention. A modified duobinary code which satisfies the Nyquist criterion III realizes bandwidth suppression similar to a duobinary code. A precoder in the current embodiment is a modified precoder 30' in which a delay circuit 32b' is two bits delay circuit instead of one bit delay circuit 32b in FIG. 3. The bandwidth restriction means in the current embodiment is a band pass filter 14c called a modified duobinary filter. FIG. 6 shows a spectrum of an ideal modified duobinary signal. The maximum frequency of an ideal modified duobinary signal spectrum is the same as that of a duobinary signal spectrum. The modified duobinary signal further suppresses D.C. component, so that it has a feature that it is robust to the signal waveform degradation due to an amplifier with low frequency cutoff characteristics. Although a modified duobinary signal is a ternary signal as is the case of a duobinary signal, it needs a precoder as shown in FIG. 5, which is different from that of FIG. 3 for a duobinary signal. Because of the presence of a specific precoder, a ternary signal provided by a modified duobinary filter has a logical 1 corresponding to high level and low level, and a logical 0 corresponding to intermediate level. Therefore, a receive side may correctly demodulate a receive signal by deciding whether a receive signal is at an intermediate level or not. It is essential that a signal shaped by a modified duobinary filter keeps waveform itself until it is transmitted into a transmission line through conversion into an optical signal, therefore, a signal amplifier which may cause inter-symbol interference is located before a modified duobinary filter. Thus, an electrical-optical converter is directly driven by an output of a modified duobinary filter so that an excellent optical waveform is obtained.

Fourth Embodiment

Figure 7:
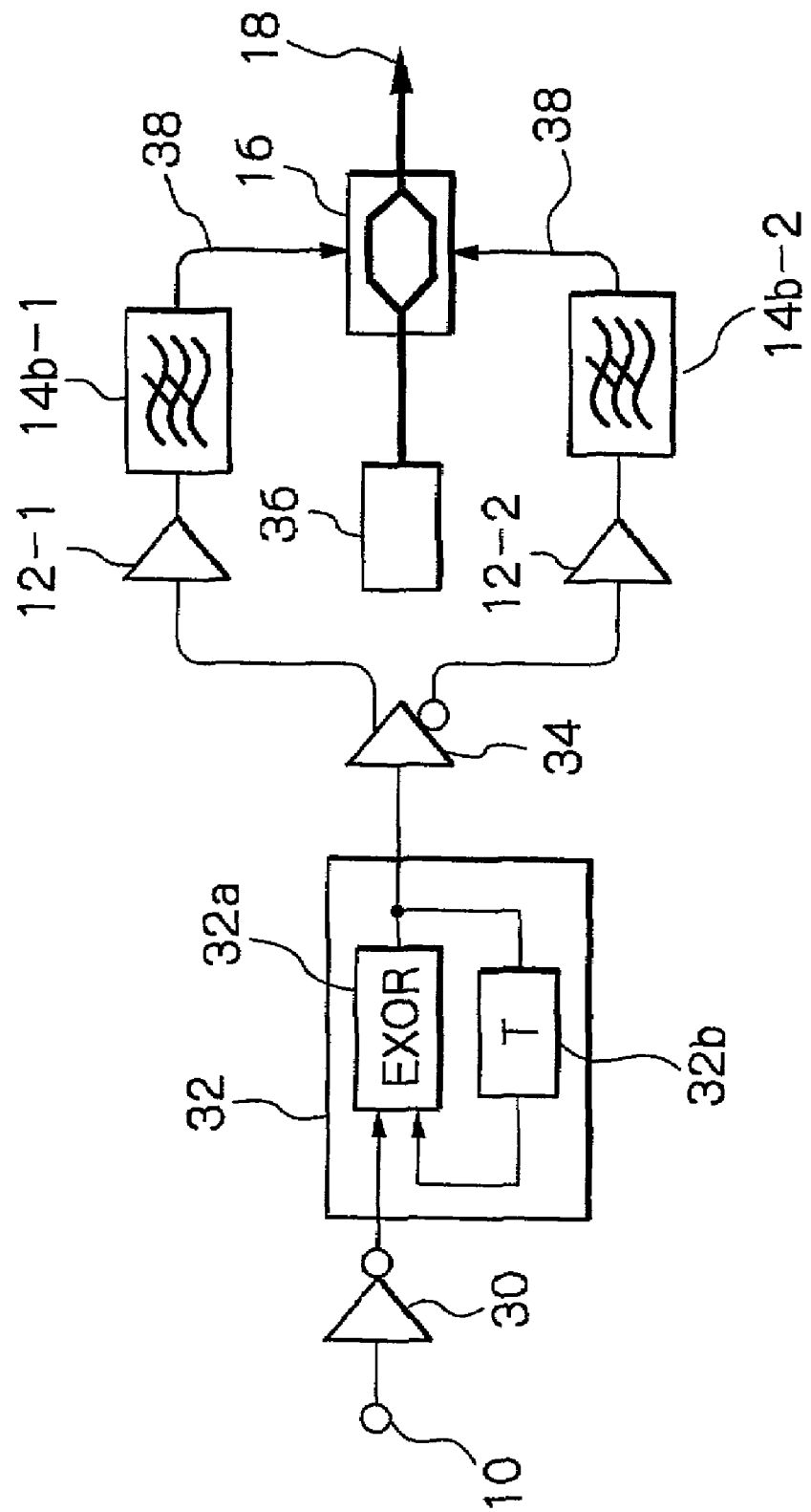
FIG. 7 is a block diagram of fourth embodiment of an optical transmitter according to the present invention.

FIG. 7 shows a fourth embodiment of an optical transmitter according to the present invention. FIG. 7 is similar to the embodiment of FIG. 3, and an electrical-optical converter is implemented by a Mach Zehnder modulator 16. An input signal applied to the Mach Zehnder modulator 16 is in differential form, so that a differential distributor 34 is provided to divide an output of the precoder 32 to two branches. The numeral 36 is an optical source which generates coherent light which is supplied to the Mach Zehnder modulator 16. FIG. 7 is an implementation of an optical transmitter which modulates a ternary duobinary signal into intensity and phase of light, and the logical operation of FIG. 7 is the same as that of FIG. 21. The feature of the embodiment of FIG. 7 is that duobinary filters (14b-1, 14b-2) are located between amplifiers (12-1, 12-2) and a MZ light modulator 16. Because of that feature, the current embodiment provides optical signal which is free from inter-symbol interference as compared with that of a prior optical duobinary transmitter in FIG. 21.

FIG. 8 shows measured waveforms of an electrical modulation signal of 40 Gbit/s, and a modulated optical signal of 40 Gbit/s. FIG. 8(a) shows waveform of electrical signal which is applied to a Mach Zehnder modulator, and has clear eye aperture on line Q-Q' having levels 1, 0 and −1. FIG. 8(b) is waveform of modulated optical signal having high level corresponding to electrical levels +1 and −1, and low level corresponding to electrical level 0. When we compare the curves of FIG. 8 with those of FIG. 25 which shows prior waveforms, it should be noted that the waveforms according to the present invention have less inter-symbol interference and have large eye aperture (on line Q-Q'), as compared with those of a prior art.

Figure 9:
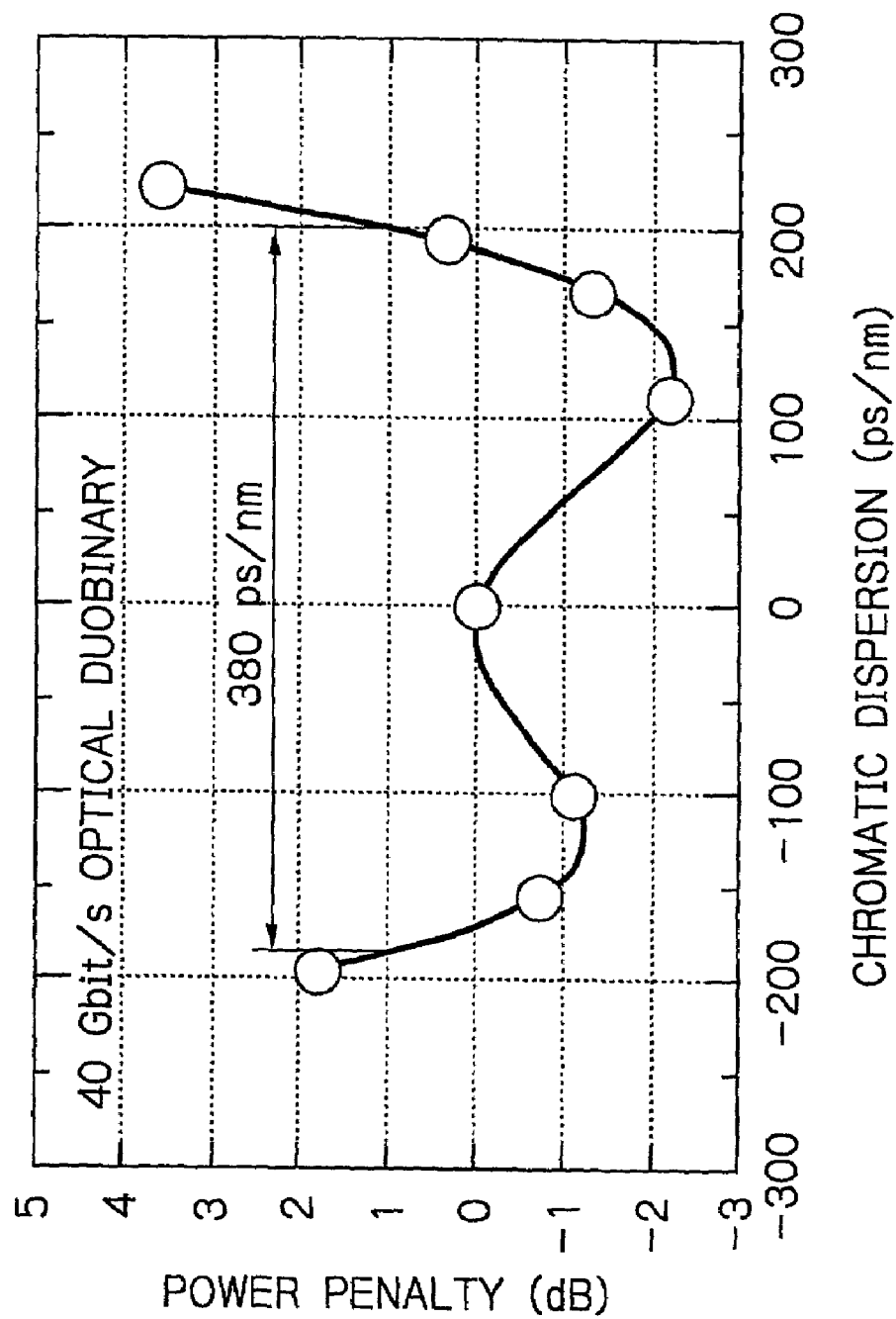
FIG. 9 shows a curve of dispersion tolerance of 40 Gbit/s signal generated by the fourth embodiment.
Figure 24:
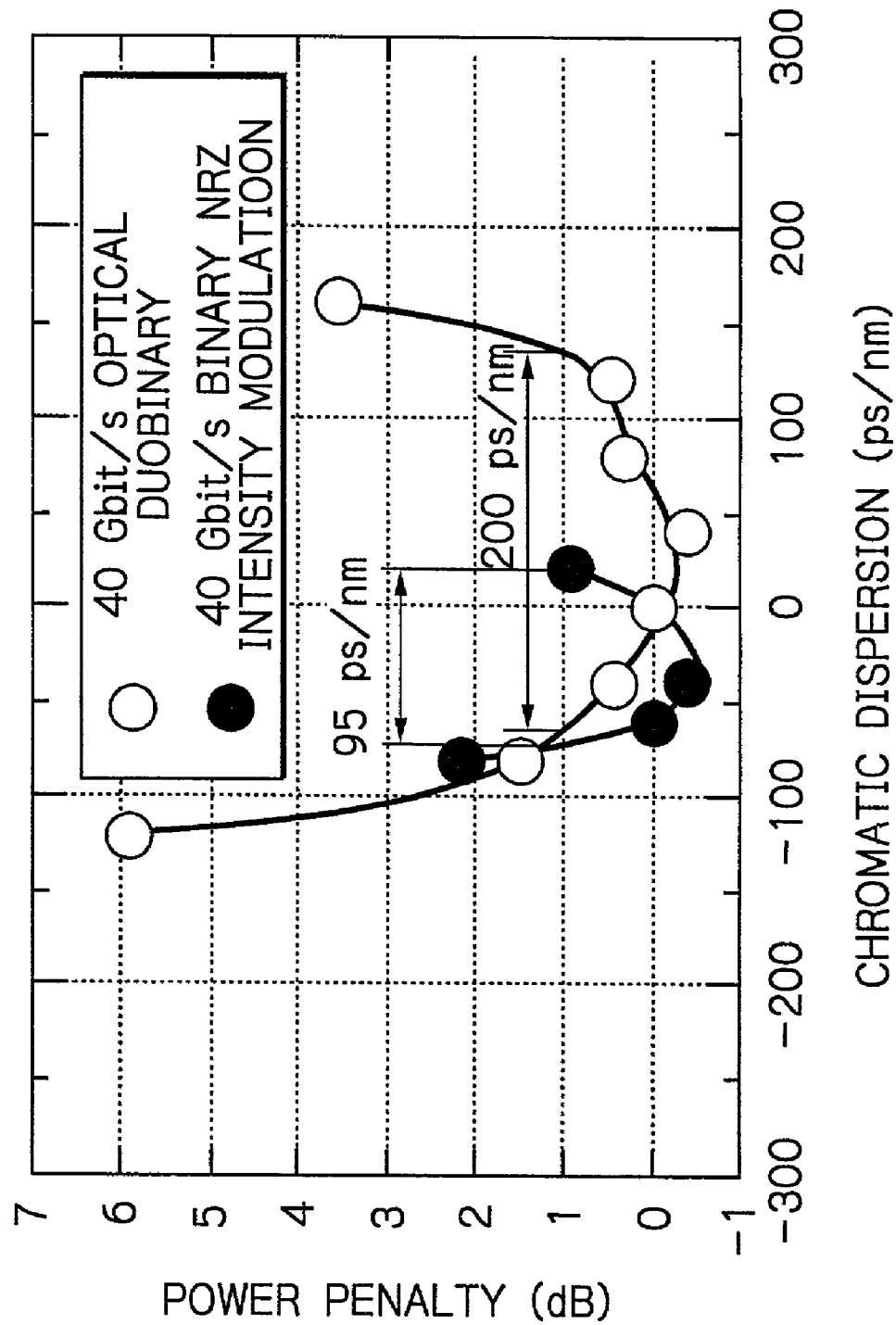
FIG. 24 shows curves of dispersion tolerance of 40 Gbit/s generated by a prior optical transmitter.

FIG. 9 shows a dispersion tolerance of 40 Gbit/s optical duobinary signal measured by rising the optical transmitter in FIG. 7. It should be noted that the dispersion tolerance which satisfies power penalty less than 1 dB is 380 ps/nm, which almost coincides with the expected value by calculation. Therefore, an optical transmitter of the current embodiment realizes essentially an ideal optical duobinary signal. On the other hand, the dispersion tolerance of a prior optical transmitter for 40 Gbit/s optical duobinary signal is 200 ps/nm as shown in FIG. 24. Thus, the present optical transmitter is clearly better than a prior optical transmitter in view of dispersion tolerance.

Fifth Embodiment

Figure 10:
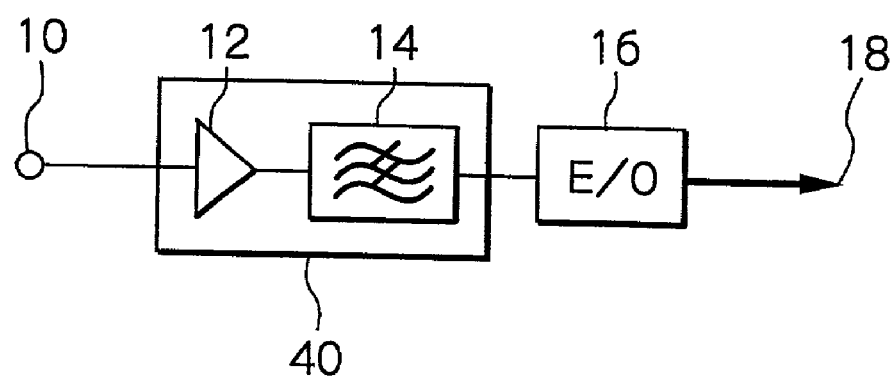
FIG. 10 is a block diagram of fifth embodiment of an optical transmitter according to the present invention.

FIG. 10 shows a block diagram of a fifth embodiment of an optical transmitter according to the present invention. The feature of the current embodiment is that a binary signal amplifier 12 and a bandwidth restriction means 14 are integrated into a module 40 so that a connector between a binary signal amplifier 12 and a bandwidth restriction means 14 is removed. The current embodiment has the advantages that a number of components mounted in a transmitter is decreased, and that the effect of reflection between a binary signal amplifier 12 and a bandwidth restriction means 14 is avoided so that a signal free from inter-symbol interference is generated.

Sixth Embodiment

Figure 11:
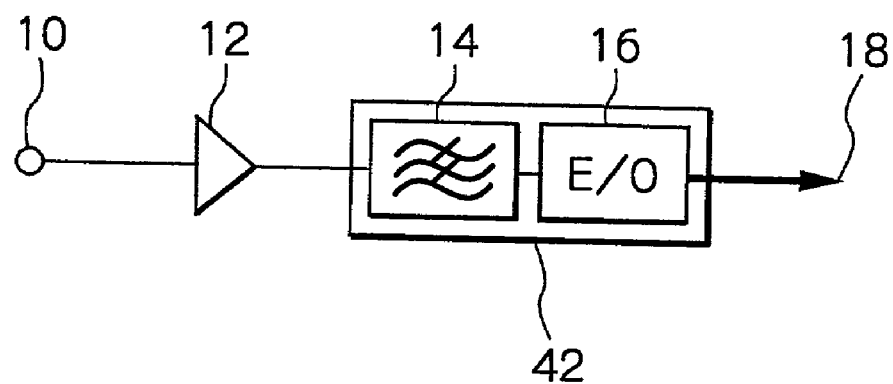
FIG. 11 is a block diagram of sixth embodiment of an optical transmitter according to the present invention.

FIG. 11 shows a block diagram of a sixth embodiment of an optical transmitter according to the present invention. The feature of the current embodiment is that a bandwidth restriction means 14 and an electrical-optical converter 16 are integrated into a module 42 so that a connector between a bandwidth restriction means 14 and an electrical-optical converter 16 is removed. The current embodiment has the advantages that a number of components mounted in a transmitter is decreased as is the case of the fifth embodiment, and that the effect of reflection between a bandwidth restriction means 14 and an electrical-optical converter 16 is avoided so that a signal free from inter-symbol interference is obtained. Further, when a binary signal amplifier 12 is mounted in the same module 42, an optical transmitter which is further compact and stable is obtained.

Seventh Embodiment

Figure 12:
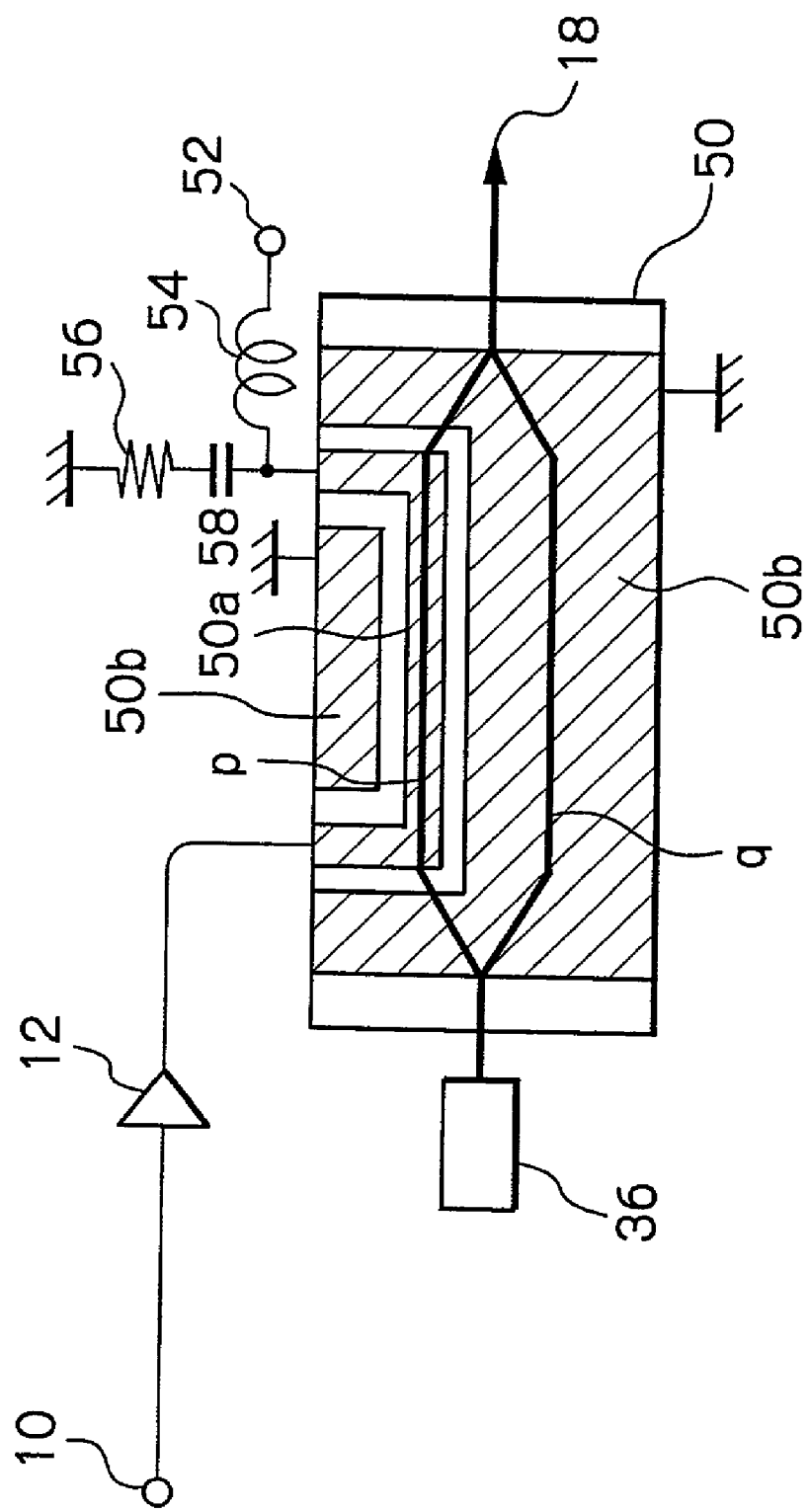
FIG. 12 is a block diagram of seventh embodiment of an optical transmitter according to the present invention.

FIG. 12 shows a seventh embodiment of an optical transmitter according to the present invention. The feature of the current embodiment is that the band-width restriction means and the electrical-optical converter in the sixth embodiment is implemented by a MZ light modulator 50 which uses a Z-cut Lithium-Niobate ($LiNbO_3$).

Conventionally, for high speed operation, a MZ light modulator using Lithium-Niobate takes shortened electrodes, travelling wave type electrodes, and/or specific shape of electrodes. According to the present invention, the length and/or shape of electrodes are not designed for high speed operation, but designed to satisfy desired bandwidth restriction performance by using loss in an electrode, and phase mismatching between an electrical modulation signal and an optical wave which is subject to be modulated, so that a MZ light modulator doubles as a bandwidth restriction means.

Preferably, the loss in a travelling wave type electrode at $f_0/2$ is always larger than the loss at frequency higher than $f_0/2$, and modulation efficiency of said Mach Zehnder light intensity modulator at $f_0/2$ is larger than that at frequency higher than $f_0/2$, where $f_0$ is clock frequency of an electrical binary signal.

Preferably, modulation efficiency determined by the phase mismatching of a Mach Zehnder light intensity modulator at $f_0/2$ is always larger than that at frequency higher than $f_0/2$, where $f_0$ is clock frequency of an electrical binary signal.

In FIG. 12, a numeral 10 is an input terminal of an electrical data signal, 12 is an electrical amplifier, 50 is an electrical-optical converter implemented by a Mach Zehnder light modulator. The numeral 36 is an optical source which generates an optical signal subject to be modulated by the modulator 50, 18 is modulated optical signal. The numeral 52 is a D.C. bias terminal which accepts bias potential applied to the electrode 50a of the Mach-Zehnder modulator 50, 54 is an inductor, 56 is a terminal resistor, and 58 is a capacitor. The other electrode 50b of the modulator 50 is grounded. An optical beam generated by the optical source 36 is separated into two beams travelling the waveguides p and q, respectively, in the modulator 50 and then two beams are combined into a single beam so that the beam is amplitude modulated by phase difference between two beams in respective waveguides.

Figure 13:
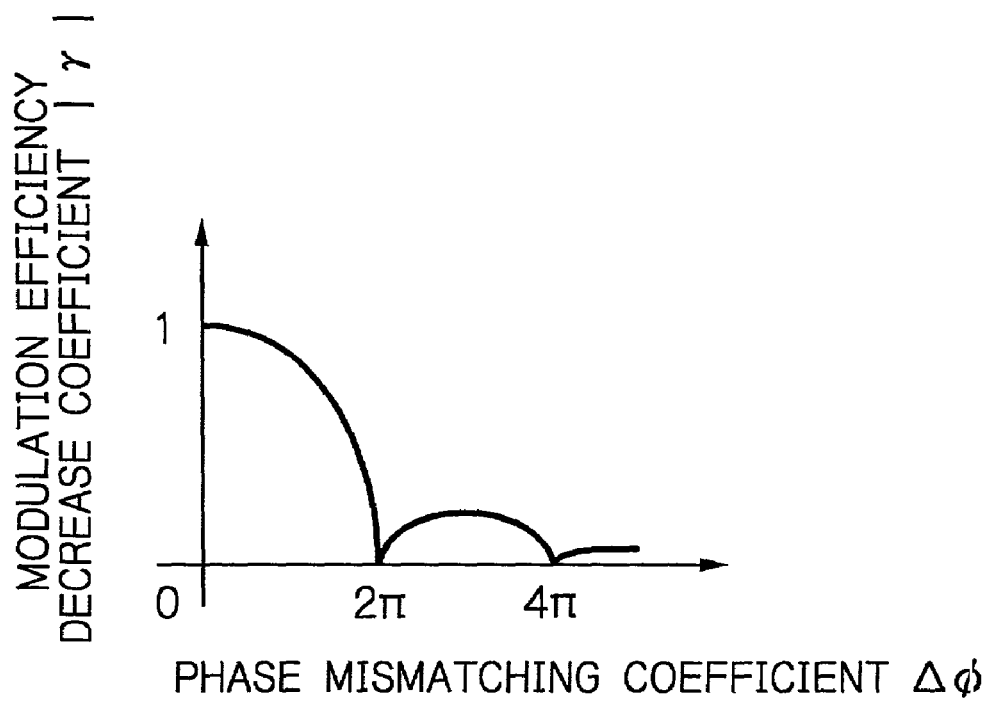
FIG. 13 shows curves showing decrease of modulation efficiency by phase mismatching in an electrical-optical modulator.

FIG. 13 shows the decrease of modulation efficiency caused by phase mismatching between the phase of electrical signal travelling an electrode, and the phase of optical signal travelling a waveguide. It is understood that the modulation efficiency decrease coefficient |r| decreases with vibration when phase mismatching coefficient $\Delta\phi$ increases, according to the following equations.

$$r = \exp[j\omega_m \tau_d (1-(c/n)c_m)-1]/j\omega_m \tau_d (1-(c/n)c_m)$$

$$\Delta\phi = \omega_m \tau_d (1-(c/n)c_m)$$

where; $\omega_m$ is angular frequency of electrical signal (rad/s), $\tau_d$ is interaction time (s) of an optical signal and an electrical signal, c/n is phase velocity (m/s) of an optical wave in an electrical-optical crystal, $c_m$ is phase velocity (m/s) of an electrical signal.

As the phase mismatching coefficient $\Delta\phi$ is proportional to angular frequency $\omega_m$ of electrical modulation wave, the modulation efficiency decreases depending upon the increase of tide angular frequency of electrical modulation wave. Further, the phase mismatching coefficient $\Delta\phi$ is a function of interaction time $\tau_d$ of electrical modulation wave and optical wave to be modulated, and phase velocity $c_m$ of electrical modulation wave, therefore, the modulation frequency characteristic of the modulation efficiency decrease coefficient r is designed according to $\tau_d$ and $c_m$. Thus, a MZ light modulator can double as a filter by designing modulation efficiency decrease coefficient r properly.

Eighth Embodiment

Figure 14:
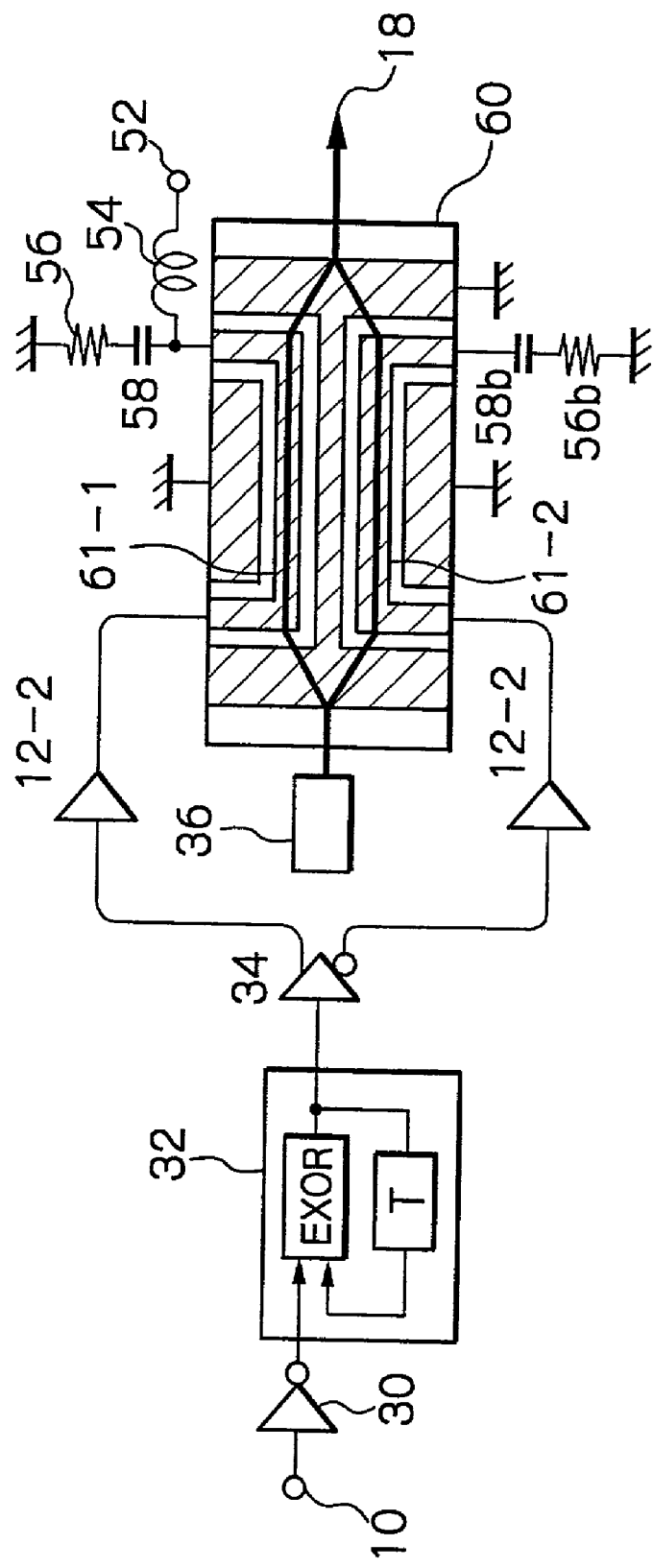
FIG. 14 is a block diagram of eighth embodiment of an optical transmitter according to the present invention.

FIG. 14 shows an eighth embodiment of an optical transmitter according to the present invention. The feature of the present embodiment is an optical duobinary transmitter which has a dual electrode type MZ light modulator 60 having $LiNbO_3$, and each of said electrodes (61-1, 61-2) is used as a duobinary filter. A precoded binary NRZ signal in differential form is applied to a pair of electrodes (61-1, 61-2) of the MZ Light modulator 60, so that the polarity of a signal applied to a first electrode 61-1 is opposite to the polarity of a signal applied to a second electrode 61-2. As the electrodes function as a duobinary filter, the electrodes are designed so that the duobinary filter has 3 dB cut-off frequency around the frequency of ¼ of a signal clock frequency. The phase change in the modulated optical signal has waveforms of a ternary duobinary signal, and the MZ light modulator provides an optical duobinary signal in which the light intensity is the maximum for the maximum phase change and the minimum phase change, the light intensity is the minimum around the midpoint of the optical phase changes, and the phase of the optical signal of the maximum intensity for the maximum phase is opposite to that for the minimum phase.

Ninth Embodiment

Figure 15:
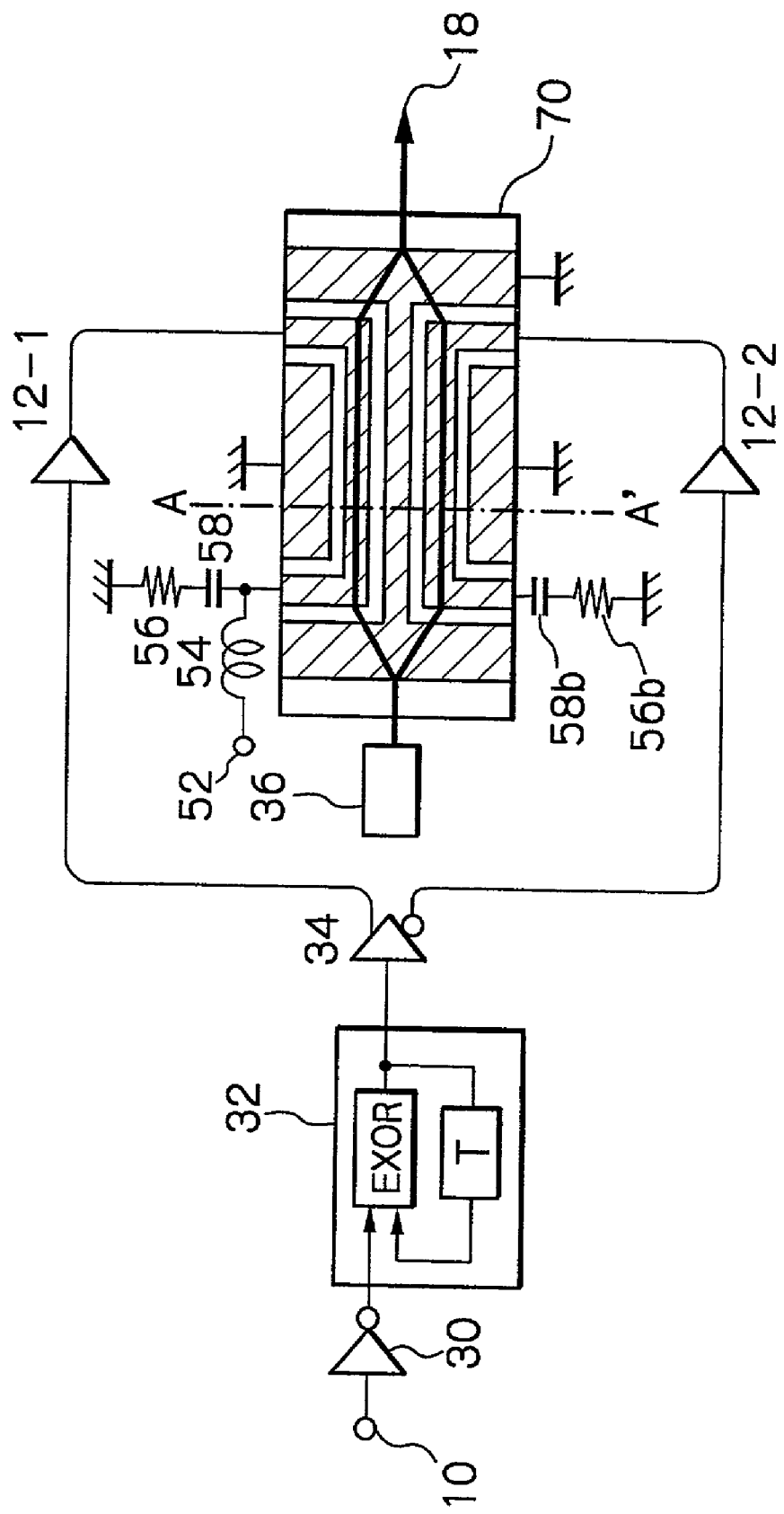
FIG. 15 is a block diagram of ninth embodiment of an optical transmitter according to the present invention.

FIG. 15 shows a ninth embodiment of an optical transmitter according to the present invention. The feature of the current embodiment is that the travelling direction of electric modulation wave propagating on an electrode is opposite to the travelling direction of optical wave propagating in an optical waveguide in Lithium-Niobate crystal so that phase mismatching condition is generated to provide bandwidth restriction characteristic in electrodes. Other portions in FIG. 15 are the same as those in FIG. 14. In FIG. 15, optical wave generated by a light source 36 propagates in the figure from left to right, while electric wave of an output of amplifiers 12-1, and 12-2 propagate in the figure from right to left. The opposite travelling direction means that a sign of light velocity c/n in a waveguide and a sign of an electric modulation wave velocity $c_m$ are opposite to each other in the definition of the phase mismatching coefficient $\Delta\phi$ in FIG. 13, therefore, the value $(1-(c/n)c_m)$ is larger than 1, and the phase mismatching coefficient $\Delta\phi$ is large.

Figure 16:
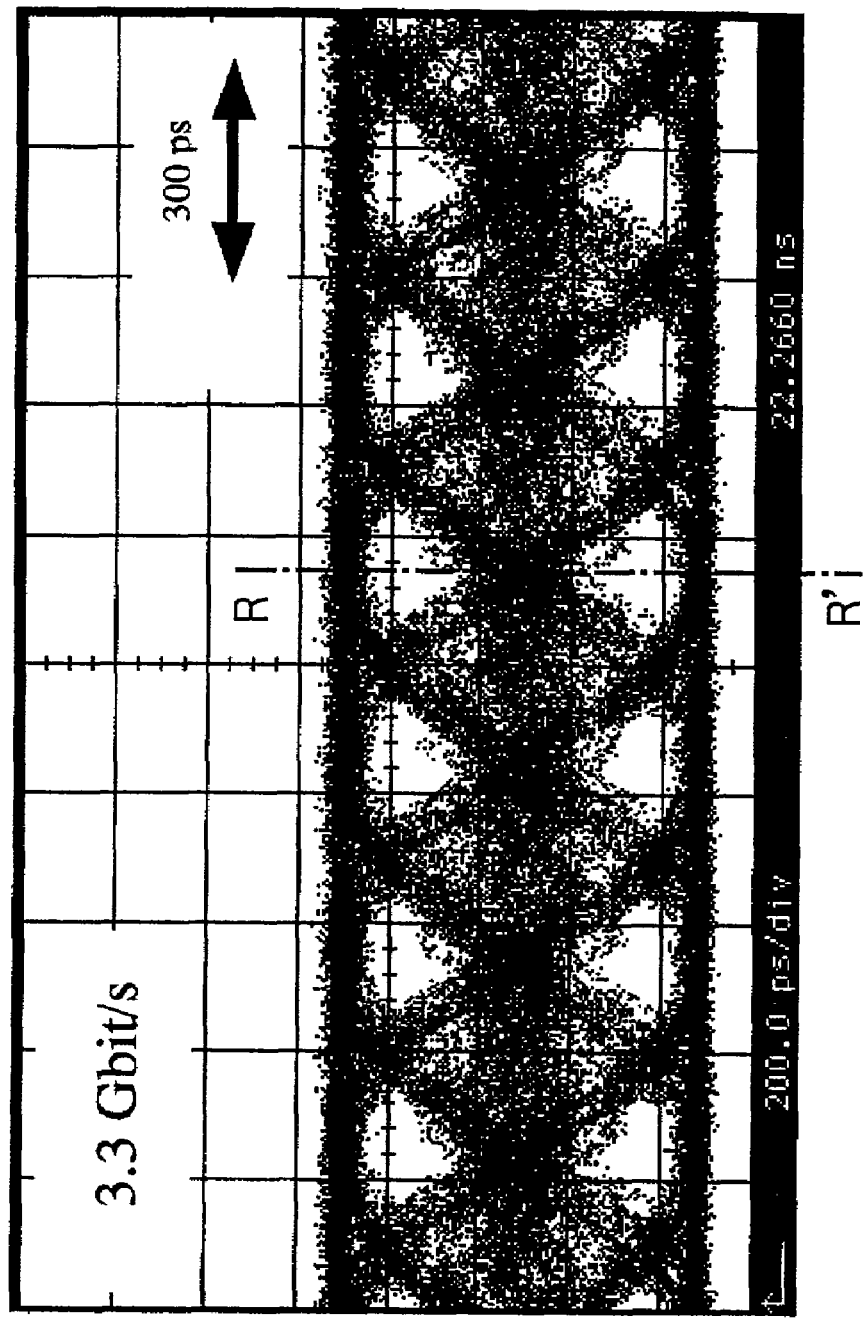
FIG. 16 shows intensity waveforms of a ternary optical duobinary signal generated by the ninth embodiment.
Figure 17:
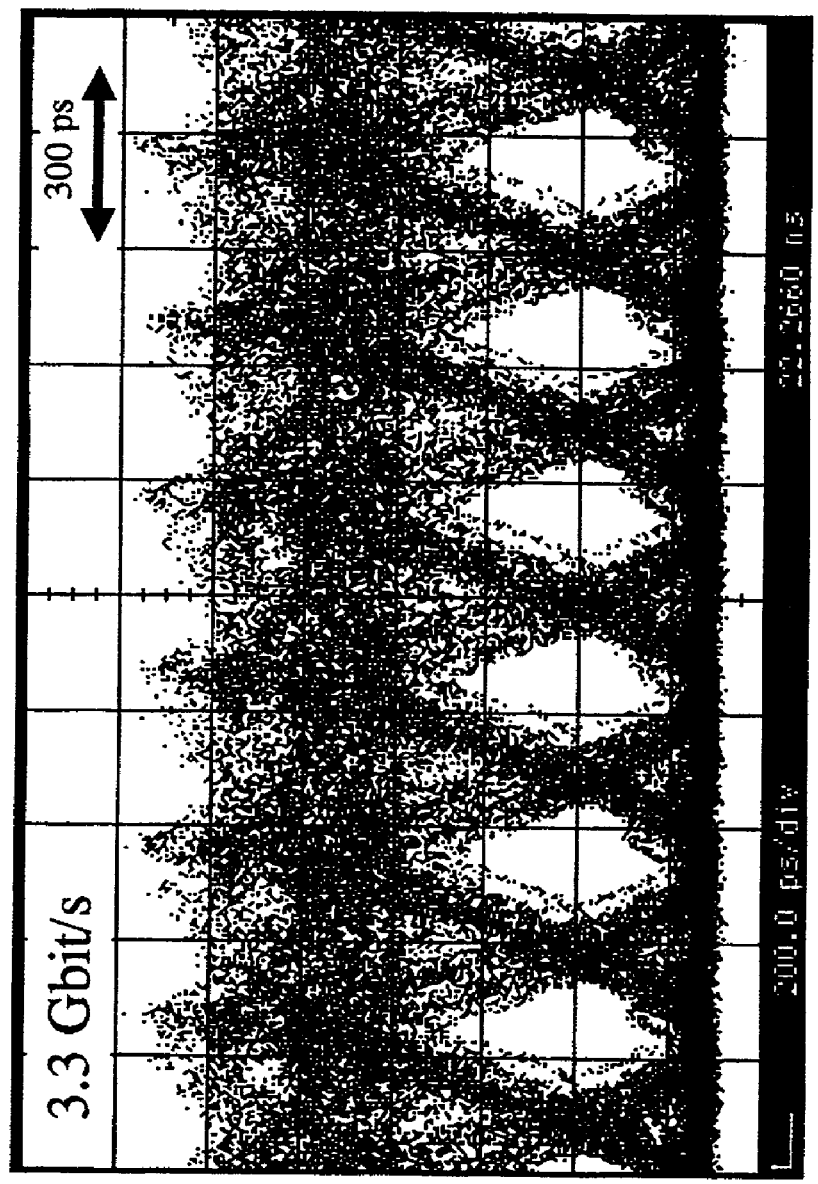
FIG. 17 shows binary intensity waveforms of phase inverted optical duobinary signal generated by the ninth embodiment.

In order to confirm the effect of the ninth embodiment, we measured optical intensity waveforms obtained by using a Lithium-Niobate MZ optical modulator in which an input electrical wave travels in opposite direction to that of an optical output. The modulator has 10 GHz bandwidth when an input electrical wave travels in the same direction as that of an optical output. The amplitude of the electrical modulation signal and the bias voltage of the MZ optical modulator were set so that light intensity can be observed as a ternary duobinary signal, in order to observe that the bandwidth restriction caused by phase mismatching converts a binary NRZ signal into a ternary duobinary signal. FIG. 16 shows an eye pattern of the measured ternary duobinary signal having bit rate 3.3 Gbit/s. An eye aperture opens along a line R-R'. It is understood visually in FIG. 16 that the bandwidth is restricted by the phase mismatching between electrical modulation wave and light wave which is subject to be modulated, and a binary NRZ signal is converted into a ternary duobinary signal. A phase inverted optical duobinary signal is obtained by modifying only bias voltage of a MZ modulator in FIG. 16, and FIG. 17 shows the intensity waveforms of said phase inverted optical duobinary signal. It is understood in FIG. 17 that an eye aperture is kept as a binary signal. The drive voltage of the MZ modulator in FIG. 17 is half of the drive voltage requested for ordinary optical duobinary modulation, since FIG. 17 is intended to measure optical intensity waveforms for confirming the operational principle of the invention, therefore, an inter-symbol interference on high level side is large. That inter-symbol interference may be suppressed when an optical modulator is driven with a regular drive voltage.

Tenth Embodiment

Figure 18:
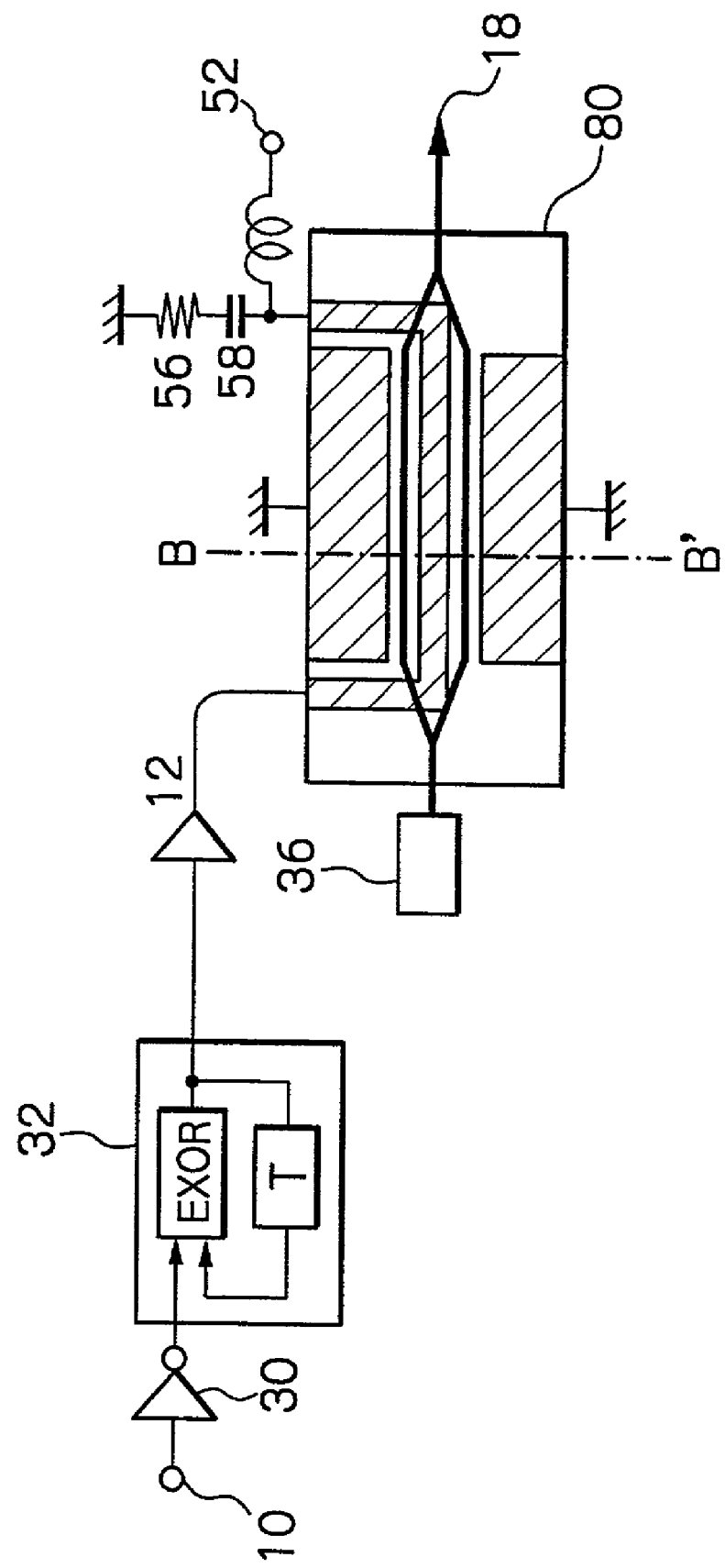
FIG. 18 is a block diagram of tenth embodiment of an optical transmitter according to the present invention.

FIG. 18 shows a tenth embodiment of an optical transmitter according to the present invention. In the current embodiment, an X-cut Lithiun-Niobate MZ optical modulator is used, but riot Z-cut.

Lithium-Niobate is uni-axis crystal, having the highest modulation efficiency when electric field is applied in Z-axis direction, therefore, Z-cut crystal is usually used in an ordinary electric-optical modulator.

Figure 19:
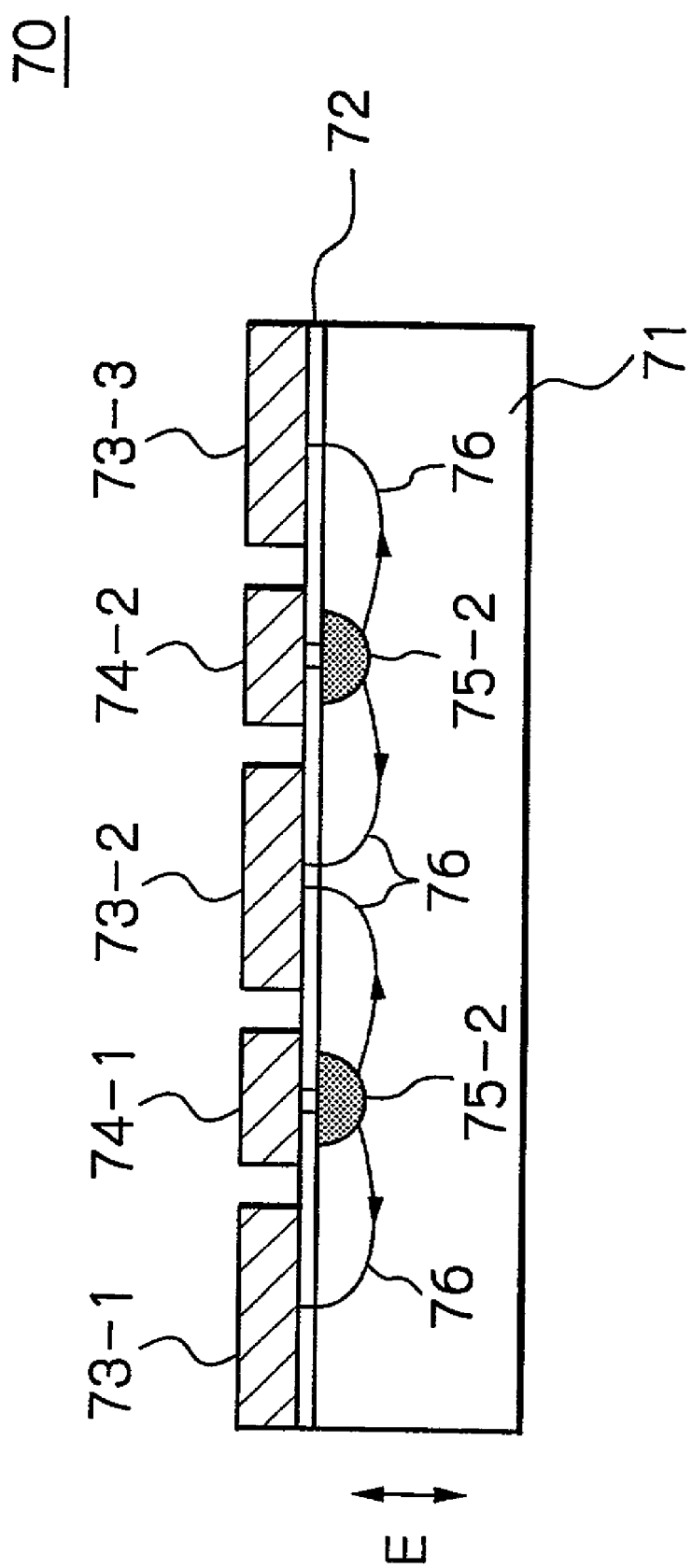
FIG. 19 shows cross section of a Z-cut Lithium-Niobate MZ optical modulator.

FIG. 19 shows cross section (along A-A' in FIG. 15) of Z-cut Lithium-Niobate optical modulator 70. The numeral 71 is a substrate of Z-cut Lithium-Niobate, on which, through a silica buffer layer 72, ground electrodes 73-1, 73-2, 73-3, and a pair of signal electrodes 74-1 and 74-2 are deposited. Under the signal electrodes 74-1 and 74-1, a pair of waveguides 75-1 and 75-2 with titanium (Ti) diffused are provided. In a Z-cut Lithium-Niobate optical modulator, electric field E is applied perpendicular to a substrate surface in an optical waveguide as shown by an arrow 76, and a pair of electrodes 74-1, 74-2 must be driven complementary so that no chirp is provided, such as an optical duobinary modulation.

Figure 20:
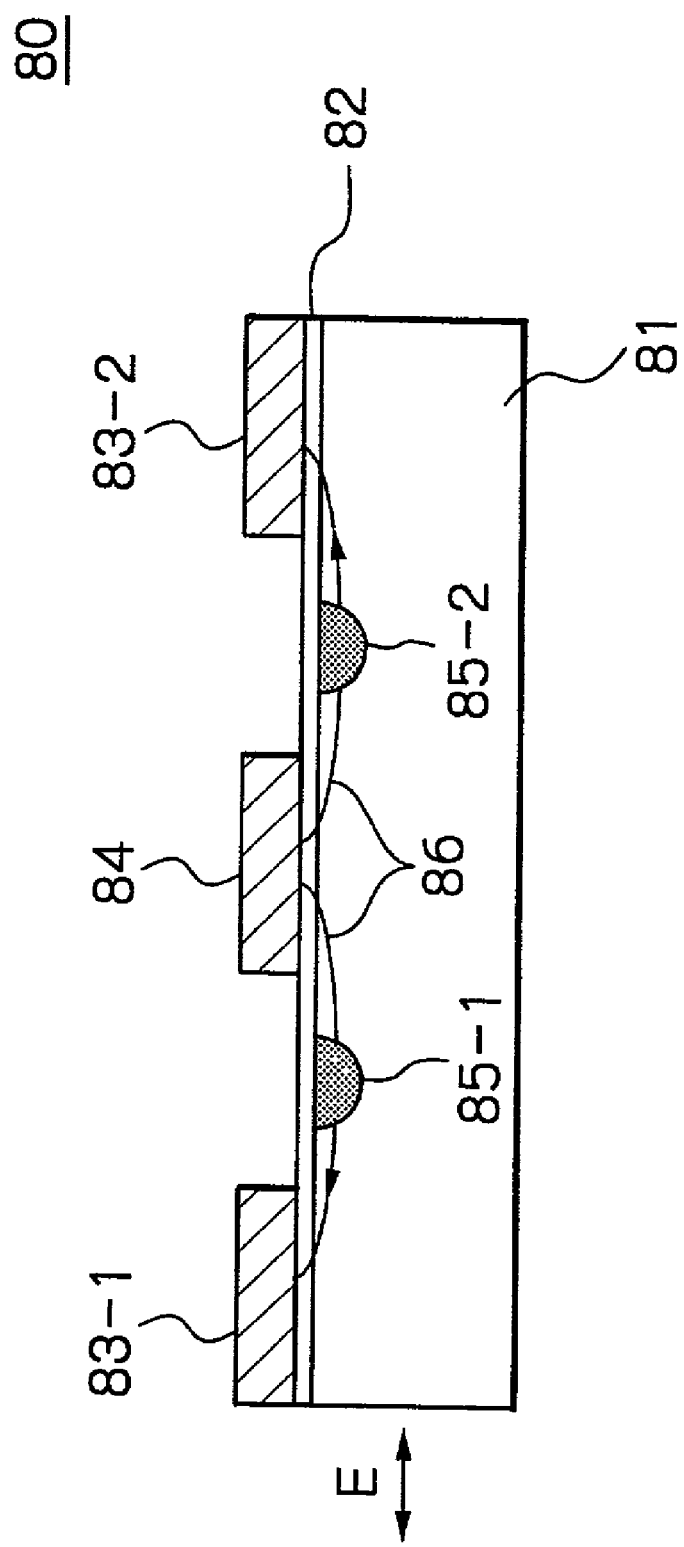
FIG. 20 shows cross section of an X-cut Lithium-Niobate MZ optical modulator.

FIG. 20 shows cross section (along B-B' in FIG. 18) of an X-cut Lithium-Niobate optical modulator 80 used in the embodiment of FIG. 18. The numeral 81 is a substrate of X-cut Lithium-Niobate, on which, through a silica buffer layer 82, ground electrodes 83-1 and 83-2, and a signal electrode 84 are deposited. In regions between signal electrodes and a ground electrode waveguide 85-1 and 85-2 with titanium diffused are provided. In an X-cut Lithium-Niobate optical modulator, an electric field E is applied parallel to a substrate surface in an optical waveguide, as shown by an arrow 86. Therefore, when a signal electrode 84 is located at the center of two waveguides of a MZ modulator, and a pair of ground electrodes 83-1 and 83-2 are located on both ends of the substrate symmetrically to the signal electrode 84 (see FIG. 18), opposite electric fields are always applied to each of the waveguides. Therefore, a chirp is zero in principle when a single electrode MZ modulator is used. The current embodiment rakes those electrodes having the bandwidth restriction performance, thus, an optical duobinary signal is generated with a simple structure of a MZ modulator.

As described above, according to the present invention, waveform shaping means such as a low pass filter is located between an electrical amplifier which drives an optical modulator, and an optical modulator, so that the electrical amplifier has only to amplify an electrical binary NRZ signal. Thus, a severe inter-symbol interference problem caused by the operation of the electrical amplifier in gain saturation region is avoided. Further, when a waveform shaping means such as a low pass filter is integrated with a driver amplifier or an optical modulator, an optical transmitter may be compact and further harmful reflection is decreased between an amplifier and a filter, or between a filter and an optical modulator. Therefore, a bandwidth restricted optical signal close to ideal condition is generated. This is beneficial to make distance long, capacity large and cost low in an optical communication system.

From the foregoing, it is now apparent that a new and improved optical transmitter has been found. It should be understood of course that the embodiments disclosed are merely illustrative and are not intended to limit the scope of the invention. Reference should be made, therefore, to the appended claims to indicate the scope of the invention.

What is claimed is:

1. An optical transmitter comprising;
    an input terminal for accepting an electrical binary signal,
    an electrical-optical conversion means for converting an electrical signal to an optical signal,
    an amplifier for amplifying an input signal applied to said input terminal to level requested for operating said electrical-optical conversion means, and applying the amplified electrical signal to said electrical-optical conversion means,
    said electrical-optical conversion means having a traveling wave type electrode operating to restrict bandwidth of an output light of said electrical-optical conversion means, wherein
    said electrical-optical conversion means is a Mach Zehnder light intensity modulator having a traveling wave type electrode,
    bandwidth of optical output of said Mach Zehnder light intensity modulator is restricted by using mismatching of phase velocity of electric wave propagating on said traveling wave type electrode and optical wave propagating in an optical waveguide having refractive index depending upon electrical field generated by said electric wave,
    a precoding means is provided at an input stage of said amplifier,
    said precoding means provides an output which is the same as the previous output when an is input binary digital signal is 0, and an output which differs from the previous output when an input digital signal is 1, and
    said traveling wave type electrode is designed so that phase change of optical wave propagating in said optical waveguide depending upon said electrical field has waveforms of a ternary duobinary signal,
    wherein modulation efficiency of said Mach Zehnder light intensity modulator at f0/2 is always larger than that at frequency higher than f0/2, where f0 is clock frequency of said electrical binary signal.

2. An optical transmitter comprising:
    an input terminal for accepting an electrical binary signal,
    an electrical-optical conversion means for converting an electrical signal to an optical signal,
    an amplifier for amplifying an input signal applied to said input terminal to level requested for operating said electrical-optical conversion means, and applying the amplified electrical signal to said electrical-optical conversion means,
    said electrical-optical conversion means having a traveling wave type electrode operating to restrict bandwidth of an output light of said electrical-optical conversion means, wherein
    said electrical-optical conversion means is a Mach Zehnder light intensity modulator having a traveling wave type electrode,
    bandwidth of optical output of said Mach Zehnder light intensity modulator is restricted because of loss of said traveling wave type electrode,
    a precoding means is provided at an input stage of said amplifier,
    said precoding means provides an output which is the same as the previous output when an input binary digital signal is 0, and an output which differs from the previous output when an input digital signal is 1, and
    said traveling wave type electrode is designed so that phase change of optical wave propagating in said optical waveguide depending upon said electrical field has waveforms of a ternary duobinary signals
    wherein modulation efficiency of said Mach Zehnder light intensity modulator at f0/2 is always larger than that at frequency higher than f0/2, where f0 is clock frequency of said electrical binary signal.

* * * * *